(12) United States Patent
Imamura et al.

(10) Patent No.: US 8,768,397 B2
(45) Date of Patent: Jul. 1, 2014

(54) TRANSMISSION POWER CONTROL ON A WIRELESS COMMUNICATION DEVICE FOR A PLURALITY OF REGULATED BANDS OR COMPONENT CARRIERS

(75) Inventors: Kimihiko Imamura, Vancouver, WA (US); Prem L. Sood, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 607 days.

(21) Appl. No.: 12/688,880

(22) Filed: Jan. 16, 2010

(65) Prior Publication Data

US 2011/0081934 A1    Apr. 7, 2011

Related U.S. Application Data

(63) Continuation-in-part of application No. 12/572,563, filed on Oct. 2, 2009.

(51) Int. Cl.
*H04B 7/00* (2006.01)

(52) U.S. Cl.
USPC .......... 455/522; 455/69; 455/127.1; 455/500; 455/517; 455/509; 370/310; 370/328; 370/329; 370/338; 370/343

(58) Field of Classification Search
USPC .......... 455/522, 69, 68, 127.1, 500, 517, 515, 455/509, 426.1, 426.2, 412.1, 412.2, 403, 455/422.1, 552.1, 550.1, 445; 370/310, 370/328, 329, 338, 343
See application file for complete search history.

(56) References Cited

U.S. PATENT DOCUMENTS

| | | | |
|---|---|---|---|
| 5,584,057 A * | 12/1996 | Dent | 455/101 |
| 6,785,520 B2 | 8/2004 | Sugar et al. | |
| 7,020,482 B2 | 3/2006 | Medvedev et al. | |
| 7,054,384 B1 | 5/2006 | Ma et al. | |
| 7,792,207 B2 | 9/2010 | Harel et al. | |
| 8,059,611 B2 | 11/2011 | Ishii et al. | |
| 8,279,806 B2 | 10/2012 | Sagfors et al. | |
| 8,437,798 B2 * | 5/2013 | Fabien et al. | 455/552.1 |
| 2005/0014524 A1 | 1/2005 | Lott et al. | |
| 2005/0282506 A1 | 12/2005 | Azuma | |
| 2006/0003787 A1 | 1/2006 | Heo et al. | |
| 2008/0151798 A1 | 6/2008 | Camp | |

(Continued)

FOREIGN PATENT DOCUMENTS

| | | |
|---|---|---|
| EP | 1 655 871 | 5/2006 |
| EP | 2 009 829 | 12/2008 |

(Continued)

OTHER PUBLICATIONS

Nokia Siemens Networks, Nokia, "Uplink Power Control for LTE-Advanced," 3GPP TSG RAN WG1 #58bis Meeting, R1-093906, Oct. 2009.

(Continued)

*Primary Examiner* — Keith Ferguson
(74) *Attorney, Agent, or Firm* — Austin Rapp & Hardman

(57) ABSTRACT

A wireless communication device is configured for performing uplink transmission power control. The wireless communication device includes a processor and instructions stored in memory. The wireless communication device performs uplink transmission power control for multiple regulated frequency bands or component carriers. The wireless communication device determines a total transmission power for at least one component carrier and allocates transmission power to at least one antenna.

6 Claims, 33 Drawing Sheets

(56) References Cited

U.S. PATENT DOCUMENTS

| | | | |
|---|---|---|---|
| 2008/0151819 A1 | 6/2008 | Bachi et al. | |
| 2008/0153535 A1 | 6/2008 | Gorokhov et al. | |
| 2008/0160990 A1 | 7/2008 | Karmi | |
| 2008/0161033 A1 | 7/2008 | Borran et al. | |
| 2008/0227414 A1* | 9/2008 | Karmi et al. | 455/101 |
| 2008/0261645 A1 | 10/2008 | Luo et al. | |
| 2008/0273452 A1 | 11/2008 | Khan et al. | |
| 2008/0311858 A1 | 12/2008 | Cheng et al. | |
| 2008/0316950 A1 | 12/2008 | Damnjanovic | |
| 2009/0017859 A1* | 1/2009 | Seppinen et al. | 455/522 |
| 2009/0082059 A1 | 3/2009 | Terry et al. | |
| 2009/0093219 A1 | 4/2009 | Katada et al. | |
| 2009/0110114 A1 | 4/2009 | Onggosanusi et al. | |
| 2009/0197632 A1 | 8/2009 | Ghosh et al. | |
| 2009/0202016 A1 | 8/2009 | Seong et al. | |
| 2009/0213769 A1 | 8/2009 | Shen et al. | |
| 2009/0213955 A1 | 8/2009 | Higuchi et al. | |
| 2009/0215464 A1 | 8/2009 | Tanno et al. | |
| 2009/0238241 A1 | 9/2009 | Hooli et al. | |
| 2009/0285146 A1 | 11/2009 | Sugar et al. | |
| 2010/0002800 A1 | 1/2010 | Kim et al. | |
| 2010/0029289 A1* | 2/2010 | Love et al. | 455/450 |
| 2010/0041350 A1 | 2/2010 | Zhang et al. | |
| 2010/0067512 A1 | 3/2010 | Nam et al. | |
| 2010/0091724 A1 | 4/2010 | Ishii et al. | |
| 2010/0099429 A1 | 4/2010 | Ishii et al. | |
| 2010/0118805 A1 | 5/2010 | Ishii et al. | |
| 2010/0197339 A1 | 8/2010 | Pedersen et al. | |
| 2010/0285828 A1* | 11/2010 | Panian et al. | 455/522 |
| 2011/0038271 A1 | 2/2011 | Shin et al. | |
| 2011/0070918 A1 | 3/2011 | Hafeez | |
| 2011/0207415 A1 | 8/2011 | Luo et al. | |
| 2011/0244887 A1* | 10/2011 | Dupray et al. | 455/456.2 |
| 2012/0149427 A1* | 6/2012 | Perets et al. | 455/522 |
| 2013/0094483 A1 | 4/2013 | Marinier et al. | |
| 2013/0301533 A1 | 11/2013 | Oghenekome et al. | |

FOREIGN PATENT DOCUMENTS

| | | |
|---|---|---|
| JP | 6-284062 | 10/1994 |
| JP | 2008-166855 | 7/2008 |
| JP | 2009-89420 | 4/2009 |
| JP | 2009-141632 | 6/2009 |
| WO | 01/59945 | 8/2001 |
| WO | 2005/084379 | 9/2005 |
| WO | 2005/088864 | 9/2005 |
| WO | 2006/106613 | 10/2006 |
| WO | 2008/123148 | 10/2008 |

OTHER PUBLICATIONS

International Search Report issued for International Patent Application No. PCT/JP2011/050903 on Mar. 15, 2011.
International Search Report issued for International Patent Application No. PCT/JP2010/067610 on Nov. 22, 2010.
3GPP TS 36.213 V8.6.0, "Evolved Universal Terrestrial Radio Access (E-UTRA) Physical layer procedures," Mar. 2009.
Sharp, "The Benefits of One PA Mode of UEs Supporting Multiple PAs," R4-092747, Aug. 2009.
Sharp, "UE PA Architecture and Power Consumption in LTE-Advanced," R4-092748, Aug. 2009.
Motorola, "RF Arch for Multi-Antenna LTE-A UL," R4-093098, Aug. 2009.
3GPP TS 36.211 V8.6.0, "Evolved Universal Terrestrial Radio Access (E-UTRA) Physical Channels and Modulation," Mar. 2009.
3GPP TS 36.212 V8.6.0, "Evolved Universal Terrestrial Radio Access (E-UTRA) Multiplexing and channel coding," Mar. 2009.
Samsung, "Discussions on UL 2Tx Transmit Diversity Schemes for PUSCH in LTE-A," R1-093402, Aug. 2009.
Mitsubishi Electric, "Comparison of Uplink 2-Tx Transmit Diversity Schemes for LTE-Advanced," R1-093545, Aug. 2009.
Nokia, "Tx Diversity for LTE-Advanced PUSCH," R1-093327, Aug. 2009.
Samsung, "UL Transmission Power Control in LTE-A," R1-093395, Aug. 2009.
Nokia, "Uplink Power Control for LTE-Advanced," R1-093322, Aug. 2009.
Office Action issued for U.S. Appl. No. 12/572,563 on Oct. 3, 2012.
Office Action issued for U.S. Appl. No. 12/572,563 on Jun. 1, 2012.
Office Action issued for U.S. Appl. No. 12/572,563 on Mar. 27, 2013.
Office Action issued for U.S. Appl. No. 12/572,563 on Sep. 25, 2013.
Office Action issued for U.S. Appl. No. 12/572,563 on Apr. 25, 2014.

* cited by examiner

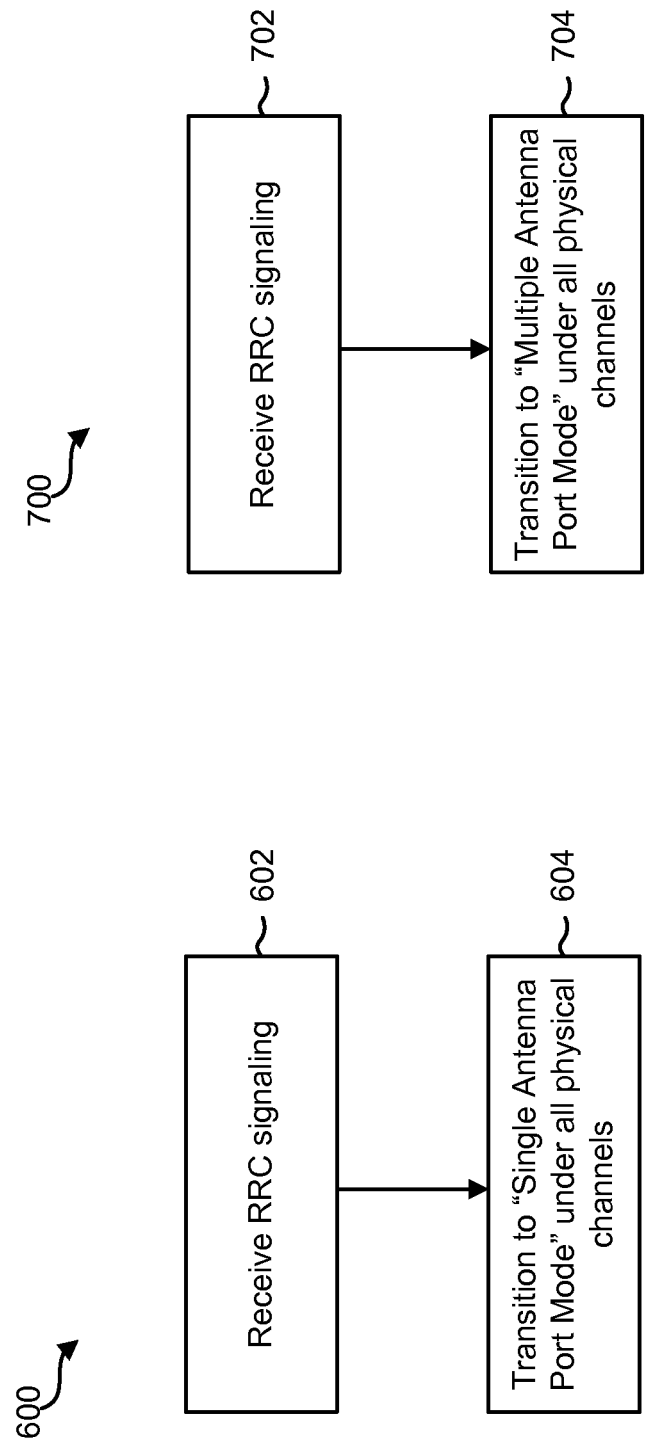

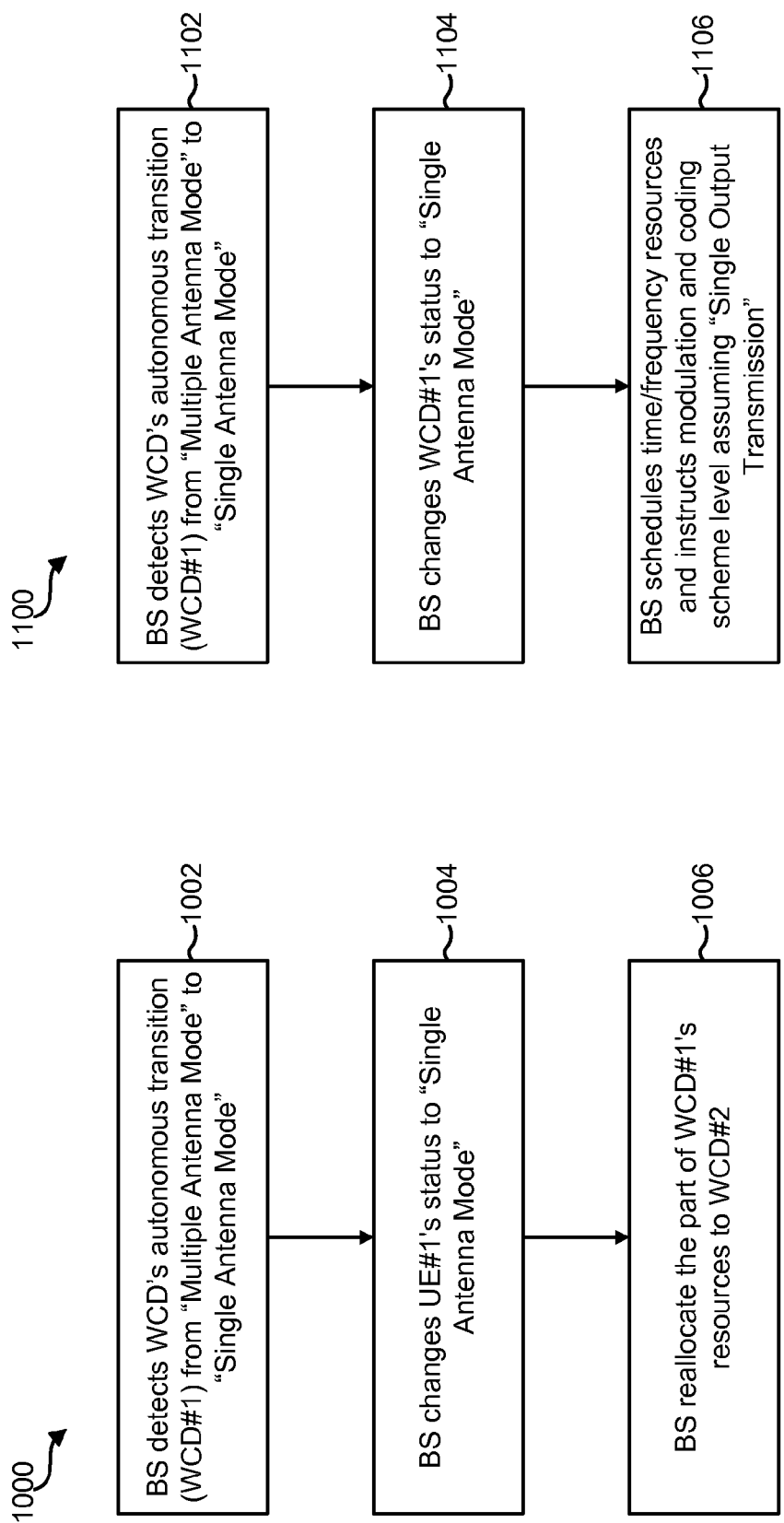

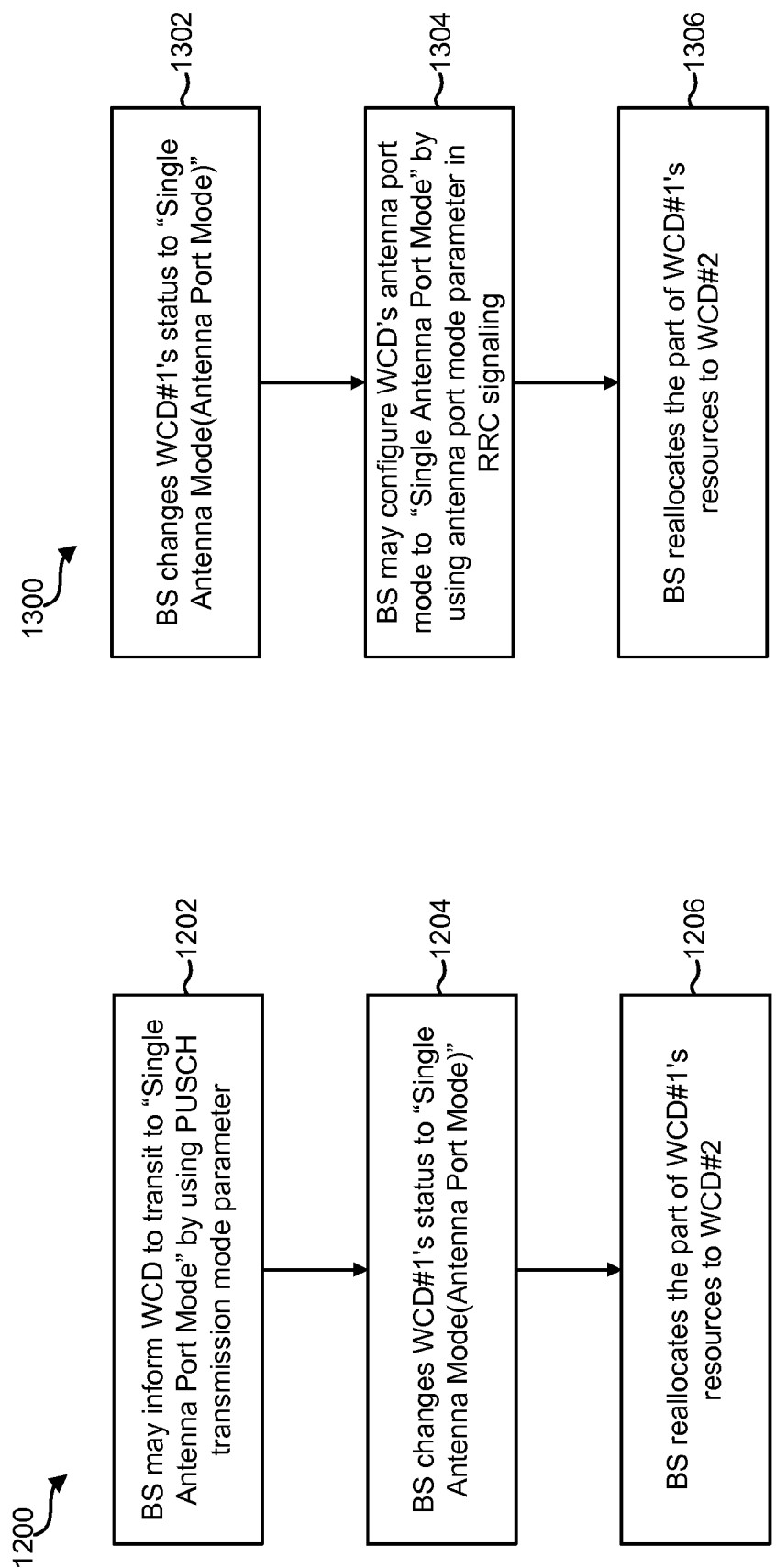

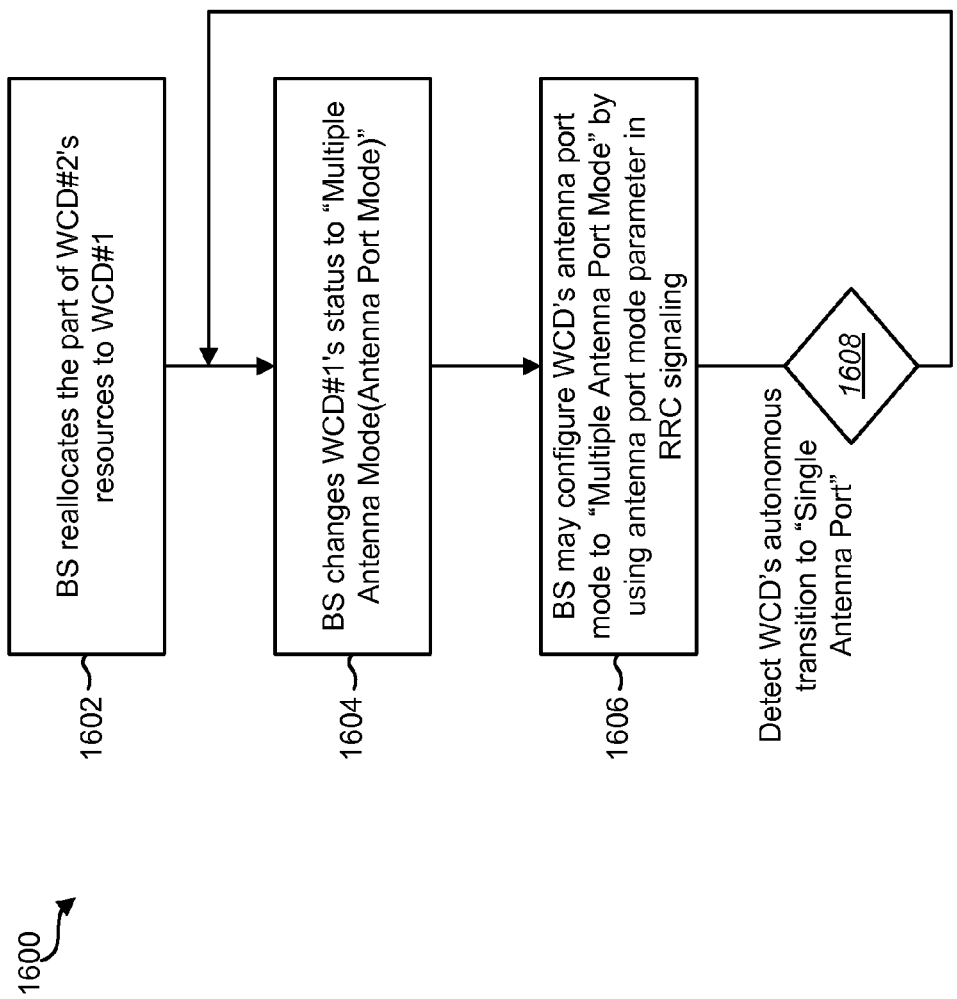

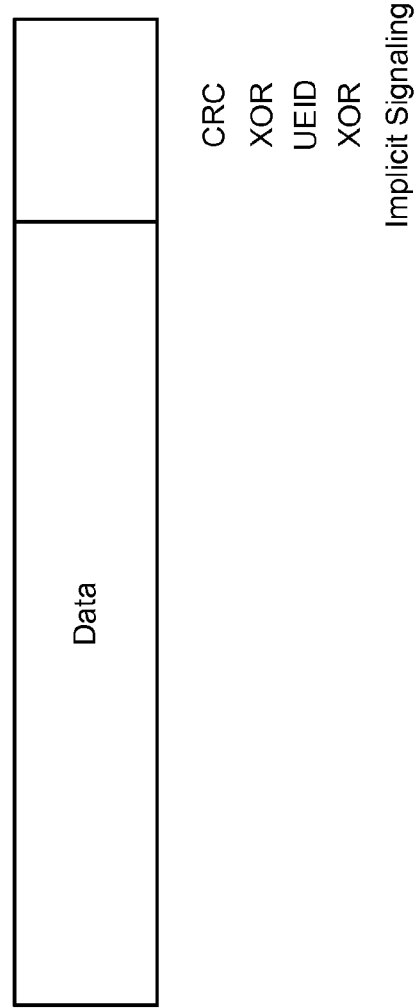
FIG. 28
Implicit Signaling
0000000000000000  in the case x=1
0101010101010101  in the case x=sqrt(½)
1111111111111111  in the case x=0
Data
CRC
XOR
UEID
XOR
Implicit Signaling
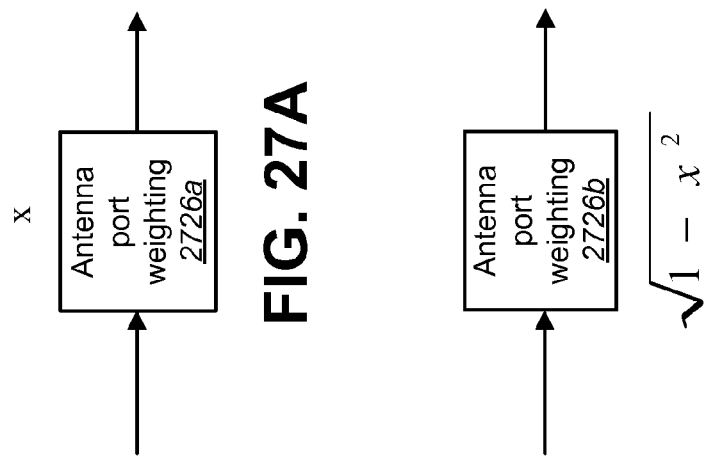
FIG. 27A
FIG. 27B

TRANSMISSION POWER CONTROL ON A WIRELESS COMMUNICATION DEVICE FOR A PLURALITY OF REGULATED BANDS OR COMPONENT CARRIERS

RELATED APPLICATIONS

This application is a continuation-in-part of U.S. patent application Ser. No. 12/572,563 entitled "Antenna Port Mode and Transmission Mode Transitions," filed Oct. 2, 2009, which is hereby incorporated by reference in its entirety.

TECHNICAL FIELD

The present disclosure relates generally to wireless communication systems. More specifically, the present disclosure relates to performing uplink transmission power control on a wireless communication device for antenna port mode and transmission mode transitions.

BACKGROUND

Wireless communication systems have become an important means by which many people worldwide have come to communicate. A wireless communication system may provide communication for a number of wireless communication devices, each of which may be serviced by a base station.

A wireless communication device is an electronic device that may be used for voice and/or data communication over a wireless communication system. A wireless communication device may alternatively be referred to as a mobile station, a user equipment, an access terminal, a subscriber station, a mobile terminal, a remote station, a user terminal, a terminal, a subscriber unit, a mobile device, etc. A wireless communication device may be a cellular phone, a smartphone, a personal digital assistant (PDA), a wireless modem, etc.

A base station is a fixed station (i.e., a wireless communication station that is installed at a fixed location) that communicates with wireless communication devices. A base station may alternatively be referred to as an access point, a Node B, an evolved Node B (eNB), or some other similar terminology.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). LTE-Advanced (LTE-A) is the next generation of LTE.

BRIEF DESCRIPTION OF THE DRAWINGS

FIG. 6 illustrates a method whereby a wireless communication device transitions from multiple antenna port mode to single antenna port mode based on radio resource control (RRC) signaling;

FIG. 7 illustrates a method whereby a wireless communication device transitions from single antenna port mode to multiple antenna port mode based on RRC signaling;

FIG. 10 illustrates a method whereby a base station may reallocate resources after it detects that a wireless communication device has autonomously transitioned from multiple antenna port mode to single antenna port mode;

FIG. 11 illustrates a method whereby a base station may schedule time/frequency resources and instruct modulation and coding scheme levels after it detects that a wireless communication device has autonomously transitioned from multiple antenna port mode to single antenna port mode;

FIG. 12 illustrates a method whereby a base station may configure a wireless communication device to transition from multiple antenna port mode to single antenna port mode via RRC signaling;

FIG. 13 illustrates another method whereby a base station may configure a wireless communication device to transition from multiple antenna port mode to single antenna port mode via RRC signaling;

FIG. 16 illustrates a method whereby a base station may configure a wireless communication device to transition from single antenna port mode to multiple antenna port mode and then subsequently detect that the wireless communication device has autonomously transitioned back to single antenna port mode;

FIG. 27A illustrates an example of an antenna port weighting process;

FIG. 27B illustrates another example of an antenna port weighting process;

FIG. 28 illustrates one way that a base station can configure an antenna port weighting process parameter (x) to be used at the wireless communication device;

DETAILED DESCRIPTION

Figure 1:
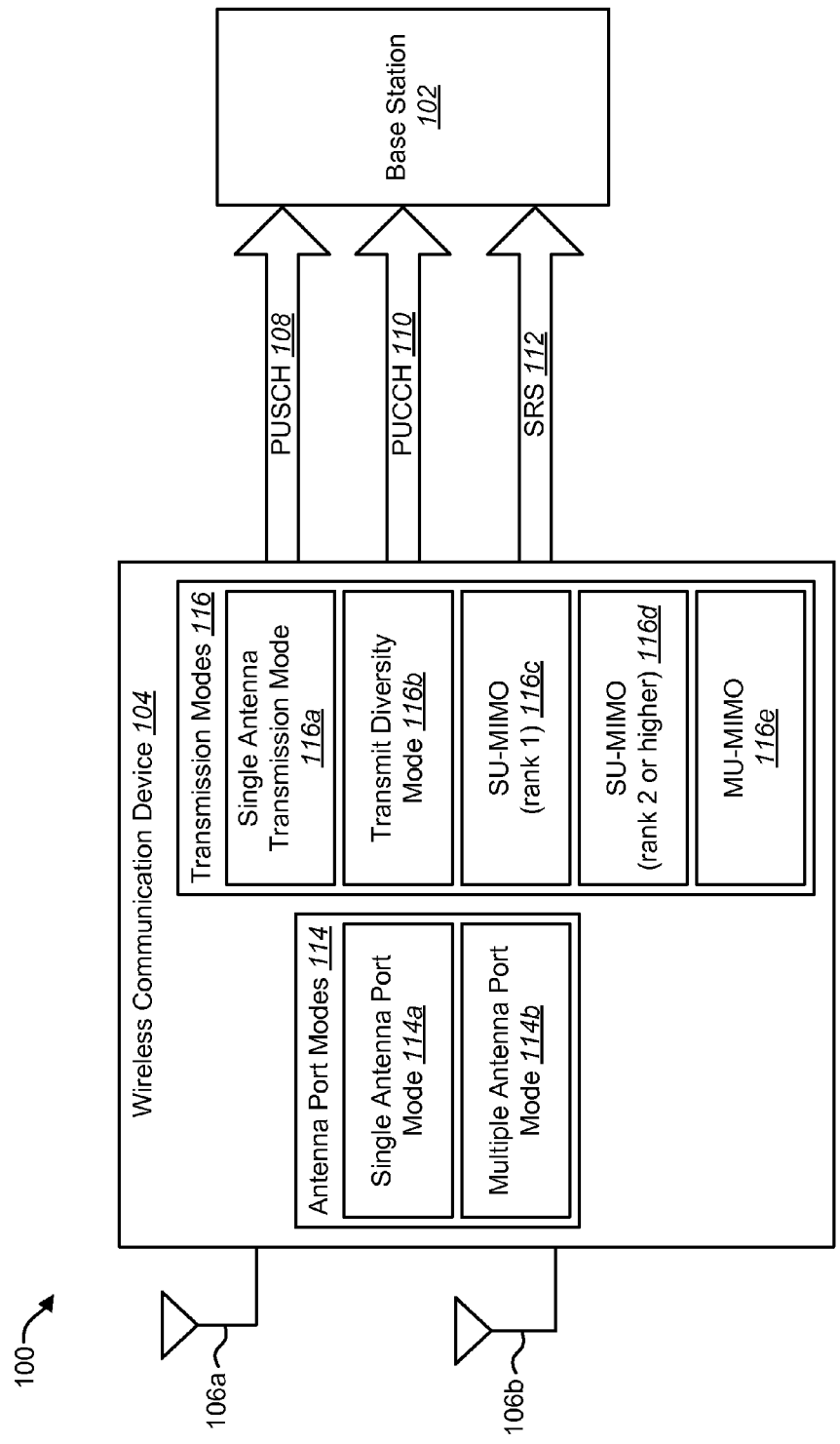
FIG. 1 illustrates a wireless communication system that includes a wireless communication device in wireless electronic communication with a base station.

A wireless communication device configured for performing uplink transmission power control on a wireless communication device is disclosed. The wireless communication device includes a processor and instructions stored in memory. The wireless communication device performs uplink transmission power control for multiple regulated frequency bands or component carriers. A total transmission power for at least one component carrier is determined. Transmission power is allocated to each antenna.

The wireless communication device may use a single power amplifier to support more than one UE power class. Alternatively, multiple power amplifiers may support a single UE power class.

The wireless communication device may use a single power amplifier for the plurality of regulated frequency bands or component carriers. Alternatively, each of the plurality of regulated frequency bands or component carriers may use a separate power amplifier.

In another configuration, the wireless communication device may use a single power amplifier for two or more but not all of the plurality of regulated frequency bands or component carriers.

The wireless communication device may perform the uplink transmission power control separately for each of the plurality of regulated bands or component carriers.

Multiple User Equipment (UE) power classes may be supported by the wireless communication device. In one configuration, a separate UE power class is set for each of the plurality of regulated frequency bands or component carriers.

The wireless communication device may send a report to the base station. The report includes a number of UE power classes supported by the wireless communication device and an identification of each of the UE power classes supported.

The wireless communication device may store and apply at least one UE configuration set. The UE configuration set may include at least one set of UE power classes. The power classes may be organized into UE categories, UE capabilities and/or UE classes.

A method for performing uplink transmission power control on a wireless communication device is disclosed. The wireless communication device may perform uplink transmission power control for multiple regulated frequency bands or component carriers. The uplink transmission power control is performed by determining a total transmission power for at least one component carrier and allocating transmission power to at least one antenna.

A computer-readable medium including instructions for performing uplink transmission power control on a wireless communication device is disclosed. The instructions are executed to perform uplink transmission power control for multiple regulated frequency bands or component carriers. Uplink transmission power control is performed by determining a total transmission power for at least one component carrier and allocating transmission power to at least one antenna.

At least some aspects of the systems and methods disclosed herein will be described in relation to the 3GPP LTE and LTE-Advanced standards (Release-8 and Release-10). However, the scope of the present disclosure should not be limited in this regard. At least some aspects of the systems and methods disclosed herein may be utilized in other types of wireless communication systems.

In 3GPP specifications, a wireless communication device is typically referred to as a User Equipment (UE), and a base station is typically referred to as a Node B or an evolved Node B (eNB). However, the scope of the present disclosure should not be limited to the 3GPP standards. Thus, the terms "UE" and "wireless communication device" may be used interchangeably herein to mean the more general term "wireless communication device." Furthermore, the terms "base station" and "eNB" may be used interchangeably herein to mean the more general term "base station." The term "communication device" may be used to denote either a wireless communication device or a base station.

FIG. 1 illustrates a wireless communication system 100 in which at least some of the methods disclosed herein may be utilized. The system 100 includes a base station 102 in wireless electronic communication with a wireless communication device 104. Communication between the base station 102 and the wireless communication device 104 may occur in accordance with the LTE-Advanced standards. The wireless communication device 104 may include multiple antennas 106a, 106b.

There may be several uplink physical channels that exist between the wireless communication device 104 and the base station 102. The physical channels may include the physical uplink shared channel (PUSCH) 108, the physical uplink control channel (PUCCH) 110 and the channel on which is sent the sounding reference signal (SRS) 112.

The wireless communication device 104 may have at least two antenna port modes 114 and several physical channels' transmission modes 116. The antenna port modes 114 may include a single antenna port mode 114a and a multiple antenna port mode 114b. The transmission modes 116 may include a single antenna transmission mode 116a, a transmit diversity mode 116b, an SU-MIMO (rank 1) mode 116c, an SU-MIMO (rank 2 or higher) mode 116d and an MU-MIMO mode 116e. (SU-MIMO stands for single-user, multiple-input-multiple-output, and MU-MIMO stands for multiple-user, multiple-input-multiple-output)

At any given time, the wireless communication device 104 may be in exactly one antenna port mode 114 and exactly one transmission mode 116. A combination of an antenna port mode 114 and a transmission mode 116 may be considered to be a transmission state.

To save battery life or take advantage of spatial resources appropriately, the wireless communication device 104 should be able to transition between the antenna port modes 114 and the transmission modes 116. At least some aspects of the systems and methods disclosed herein relate to defining consistent behavior for transitioning between these modes 114, 116.

In order for reliable communication to occur between the wireless communication device 104 and the base station 102, the base station 102 should be aware of the antenna port mode 114 in which the wireless communication device 104 is currently operating. If the wireless communication device 104 changes its antenna port mode 114 (and thus changes its transmission state) without signaling from the base station 102 (referred to as "autonomously" changing its antenna port mode 114), the base station 102 should adjust its receiver and its scheduling characteristics to adapt to the change in antenna port mode 114. Furthermore, in order for the wireless communication device 104 to be able to determine whether the base station 102 has received information about the wireless communication device's antenna port mode 114, it may be useful to define a consistent behavior by the base station 102 upon its determination of a change in antenna port mode 114. At least some aspects of the methods disclosed herein relate to a state transition mechanism that minimizes explicit signaling between the base station 102 and the wireless communication device 104 when the wireless communication device 104 changes its transmission state.

Figure 2:
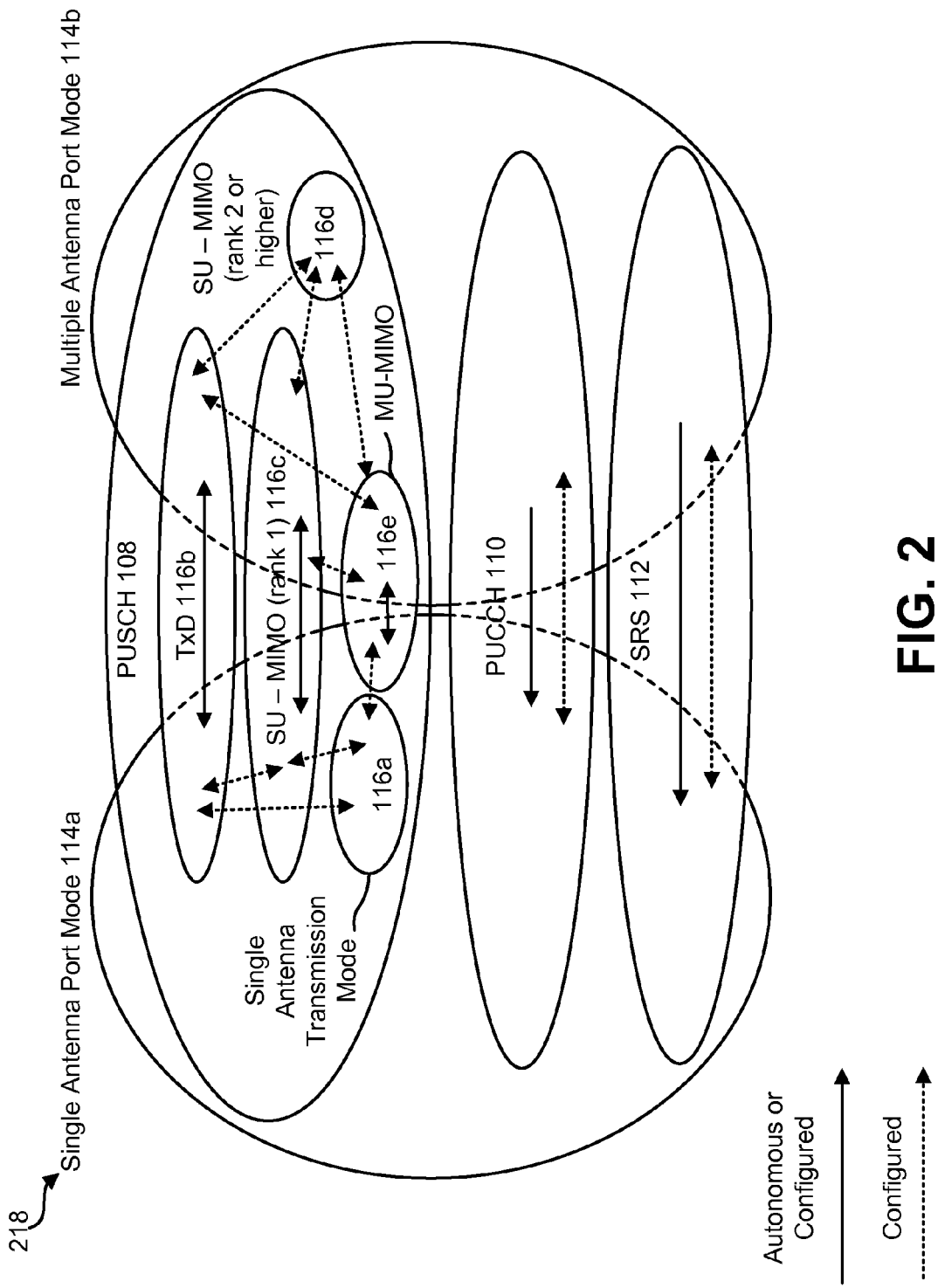
FIG. 2 illustrates a first example of how a wireless communication device may transition between antenna port modes and transmission modes.

FIG. 2 illustrates a first example of how a wireless communication device 104 may transition between antenna port modes 114 and transmission modes 116. This example may be referred to as case one 218. Each transmission mode 116 may belong to single antenna port mode 114a and/or multiple antenna port mode 114b. For example, the single antenna transmission mode 116a may belong to the single antenna port mode 114a only. The transmit diversity mode 116b, the SU-MIMO mode (rank 1) 116c and the MU-MIMO mode 116e may belong to both single antenna port mode 114a and multiple antenna port mode 114b. The SU-MIMO mode (rank 2 or higher) 116d may belong to the multiple antenna port mode 114b only.

Figure 3:
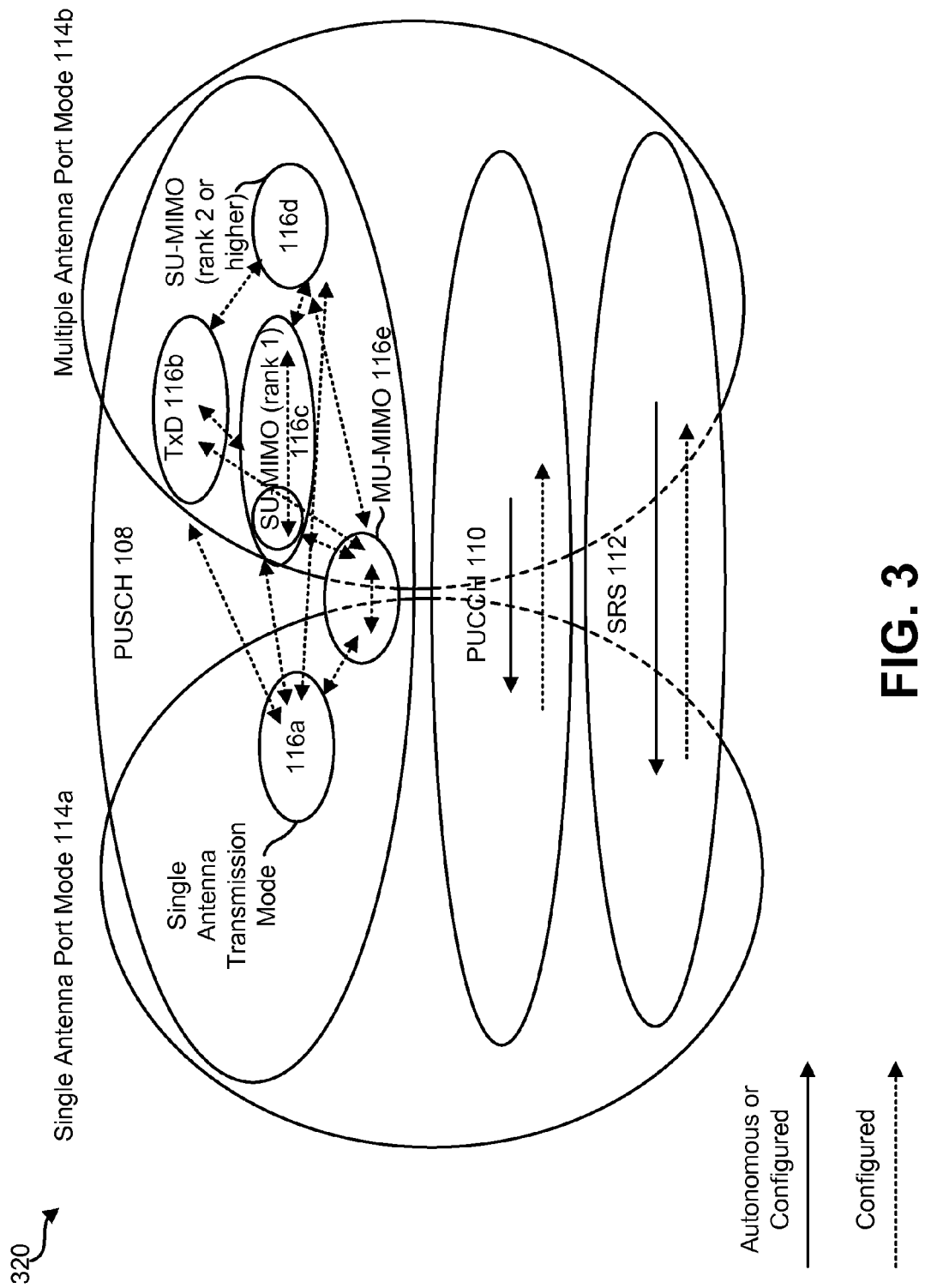
FIG. 3 illustrates a second example of how a wireless communication device may transition between antenna port modes and transmission modes.

FIG. 3 illustrates a second example of how a wireless communication device 104 may transition between antenna port modes 114 and transmission modes 116. This example may be referred to as case two 320. In case two 320, single antenna transmission mode 116a may belong to single antenna port mode 114a only. Transmit diversity mode 116b and SU-MIMO mode (rank 1) 116c may belong to multiple antenna port mode 114b only. SU-MIMO mode (rank 2 or higher) 116d may belong to multiple antenna port mode 114b only. MU-MIMO mode 116e may belong to both single antenna port mode 114a and multiple antenna port mode 114b.

A wireless communication device 104 may autonomously transition from the multiple antenna port mode 114b to the single antenna port mode 114a. When this occurs, the wireless communication device 104 may implicitly notify the base station 102 about the autonomous transition from the multiple antenna port mode 114b to the single antenna port mode 114a.

Figure 4:
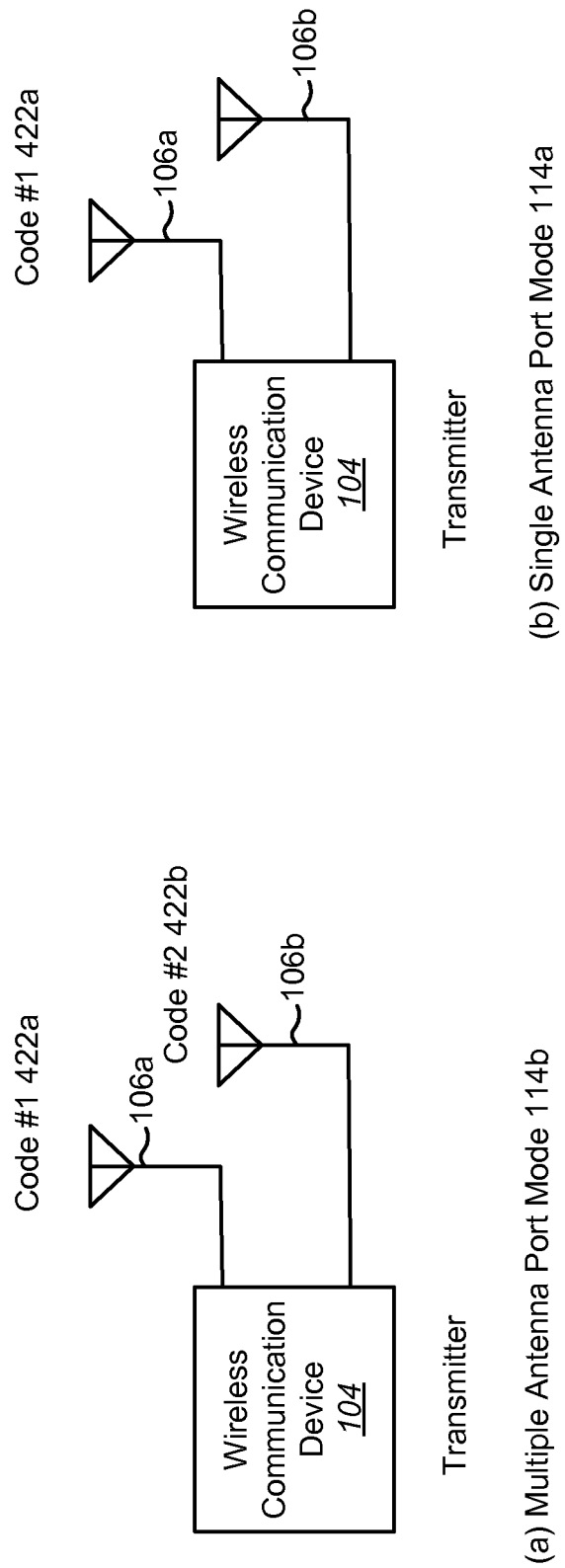
FIG. 4 illustrates an example showing how a wireless communication device may implicitly notify a base station about an autonomous transition from multiple antenna port mode to single antenna port mode.

FIG. 4 illustrates an example showing how the wireless communication device 104 may implicitly notify the base station 102 about the autonomous transition from the multiple antenna port mode 114b to the single antenna port mode 114a. The wireless communication device 104 may utilize multiple antennas 106a-b. When the wireless communication device 104 is in the multiple antenna port mode 114b, a multi-code 422a, 422b SRS 112 may be sent out. When the wireless communication device 104 transitions to the single antenna port mode 114a (without any explicit signaling to the base station 102), the wireless communication device 104 may send an SRS 112 with only one code 422a. The base station 102 may infer that the wireless communication device 104 has transitioned to the single antenna port mode 114a by detecting that the wireless communication device 104 has sent an SRS 112 with only one code 422a.

Figure 5:
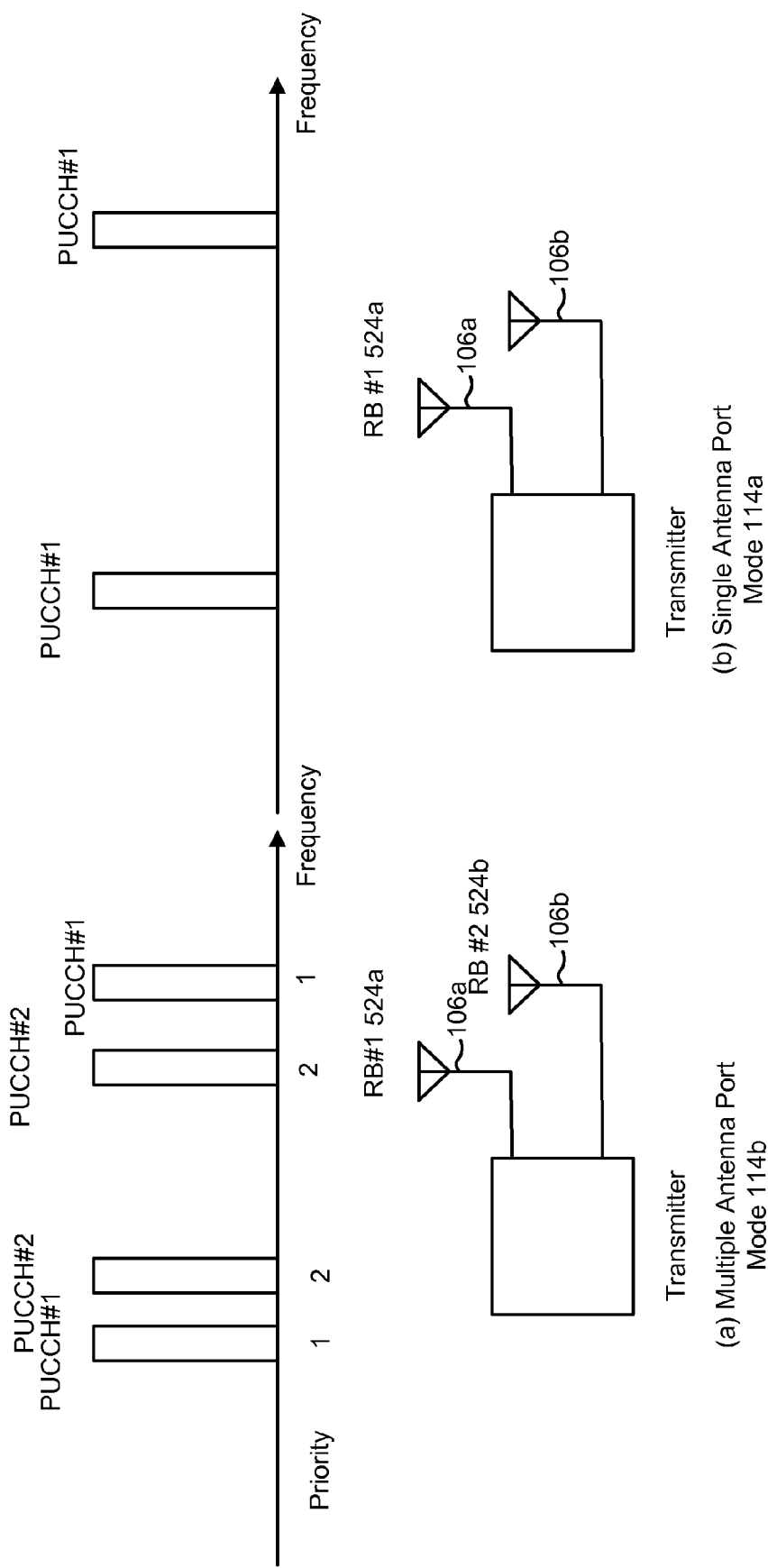
FIG. 5 illustrates another example showing how a wireless communication device may implicitly notify a base station about an autonomous transition from multiple antenna port mode to single antenna port mode.

FIG. 5 illustrates another example showing how the wireless communication device 104 may implicitly notify the base station 102 about the autonomous transition from the multiple antenna port mode 114b to the single antenna port mode 114a. The wireless communication device 104 may utilize multiple antennas 106a-b. When the wireless communication device 104 is in the multiple antenna port mode 114b, the PUCCH 110 may be sent out on multiple resource blocks (RBs) 524a, 524b. When the wireless communication device 104 transitions to the single antenna port mode 114a (without any explicit signaling to the base station 102), the wireless communication device 104 may use only one RB 524a to send the PUCCH 110.

The order of RB 524 priority for PUCCH 110 may be predefined. For example, in FIG. 5, lower frequency (or outside frequency) has a higher priority. So lower RB 524a (or outside RB 524a) will be used when the wireless communication device 104 transitions to the single antenna port mode 114a. In this case, no signaling is needed to inform the base station 102 which RB 524 will be dropped when the wireless communication device 104 transitions to the single antenna port mode 114a.

Reference is now made to FIG. 6. The method 600 of FIG. 6 illustrates that a wireless communication device 104 may be configured from the multiple antenna port mode 114b to the single antenna port mode 114a via radio resource control (RRC) signaling. More specifically, FIG. 6 illustrates that a wireless communication device 104 may receive 602 RRC signaling. In response to receiving 602 the RRC signaling, the wireless communication device 104 may transition 604 to the single antenna port mode 114a for one or more physical channels 108 (e.g., PUSCH 108, PUCCH 110, SRS 112). If the wireless communication device 104 transitions to the single antenna port mode 114a, the wireless communication device 104 may transmit the PUCCH 110 or the SRS 112 as shown in FIG. 4(b) or 5(b).

The RRC signaling referred to in FIG. 6 might include the transmission mode 116 for the PUSCH 108. An example will be described assuming that the wireless communication device 104 is configured according to case two 320 in FIG. 3 (in which the transmit diversity mode 116b, the SU-MIMO mode (rank 1) 116c and the SU-MIMO mode (rank 2) 116d belong to the multiple antenna port mode 114b, and the single antenna transmission mode 116a belongs to the single antenna port mode 114a). When a wireless communication device 104 receives a PUSCH transmission mode RRC signal that indicates the transition to the single antenna transmission mode 116a during transmit diversity mode 116b, SU-MIMO mode (rank 1) 116c or SU-MIMO mode (rank 2) 116d, the wireless communication device 104 may transition from the multiple antenna port mode 114b to the single antenna port mode 114a for one or more physical channels.

Alternatively, the RRC signaling referred to in FIG. 6 might include the antenna port mode 114. When a wireless communication device 104 receives an indication that the antenna port mode 114 should be the single antenna port mode 114a, the wireless communication device 104 may transition to the single antenna port mode 114a for one or more physical channels.

Reference is now made to FIG. 7. The method 700 of FIG. 7 illustrates that a wireless communication device 104 may be configured from the single antenna port mode 114a to the multiple antenna port mode 114b via RRC signaling. More specifically, FIG. 7 illustrates that a wireless communication device 104 may receive 702 RRC signaling. In response to receiving 702 the RRC signaling, the wireless communication device 104 may transition 704 to the multiple antenna port mode 114b for one or more physical channels 108 (e.g., PUSCH 108, PUCCH 110, SRS 112). If the wireless communication device 104 transitions to the multiple antenna port mode 114b, the wireless communication device 104 may transmit the PUCCH 110 or the SRS 112 as shown in FIG. 4(a) or 5(a).

The RRC signaling referred to in FIG. 7 might include the transmission mode 116 for the PUSCH 108. An example will be described assuming that the wireless communication device 104 is configured according to case two 320 in FIG. 3. When a wireless communication device 104 receives a PUSCH transmission mode RRC signal that indicates the transition from the single antenna transmission mode 116a to the transmit diversity mode 116b, the SU-MIMO mode (rank 1) 116c or the SU-MIMO mode (rank 2) 116d, the wireless communication device 104 may transition from the single antenna port mode 114a to the multiple antenna port mode 114b for one or more physical channels (e.g., PUSCH 108, PUCCH 110, SRS 112).

Alternatively, the RRC signaling referred to in FIG. 7 might include the antenna port mode 114. When a wireless communication device 104 receives an indication that the antenna port mode 114 should be the multiple antenna port mode 114b, the wireless communication device 104 may transition to the multiple antenna port mode 114b for one or more physical channels (e.g., PUSCH 108, PUCCH 110, SRS 112).

Figure 8:
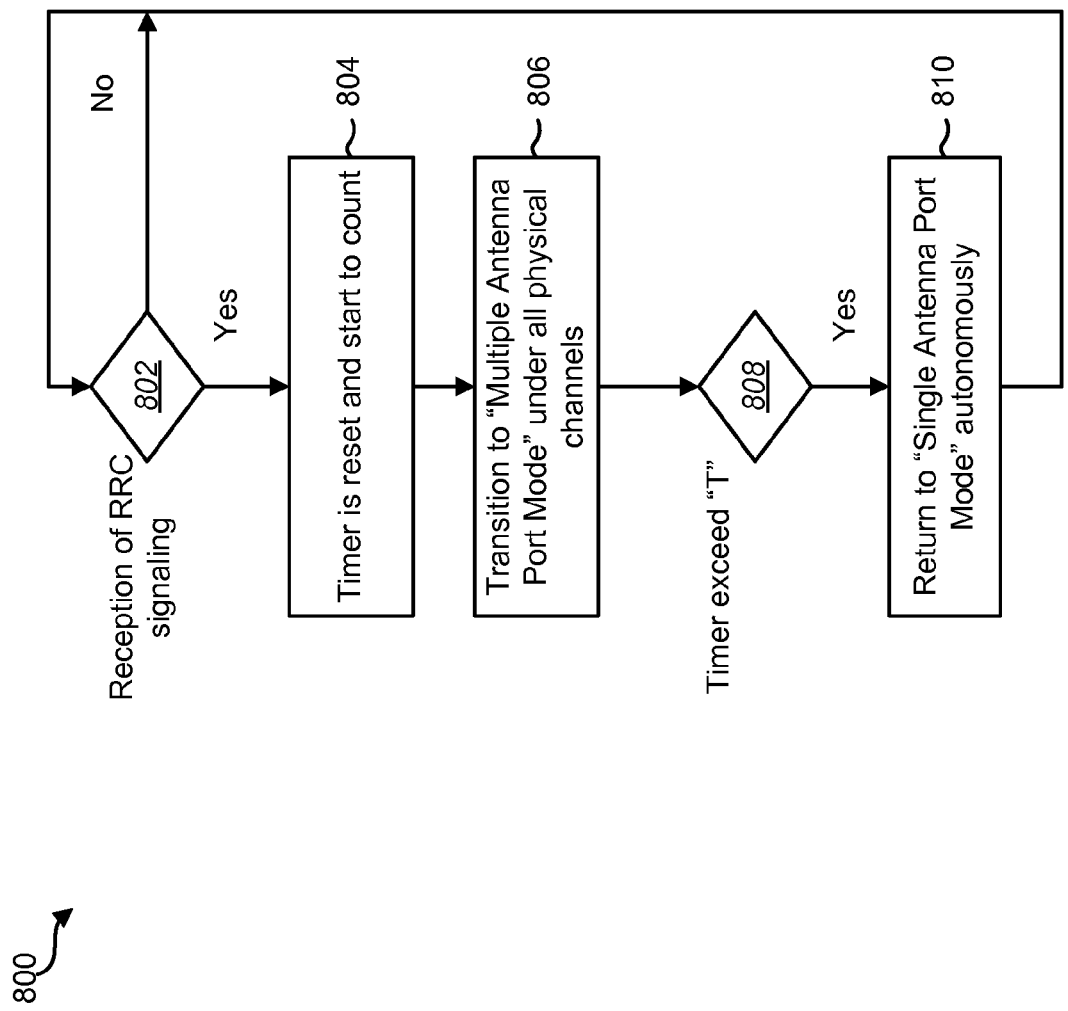
FIG. 8 illustrates a method whereby a wireless communication device may attempt to return to single antenna port mode after a defined time period.

Reference is now made to FIG. 8. The method 800 of FIG. 8 illustrates that a wireless communication device 104 may attempt to return to single antenna port mode 114a, after a defined time period (which is shown as T in FIG. 8). The time period may be known to both the wireless communication device 104 and the base station 102 via either higher layer signaling or as a class parameter for the wireless communication device 104.

More specifically, when the wireless communication device 104 receives 802 RRC signaling, the timer may be reset 804 and start to count. The wireless communication device 104 may transition 806 to the multiple antenna port mode 114b for one or more physical channels. When the wireless communication device 104 determines 808 that the timer has exceeded the defined time period (T), then the wireless communication device 104 autonomously returns 810 to the single antenna port mode 114a.

Figure 9:
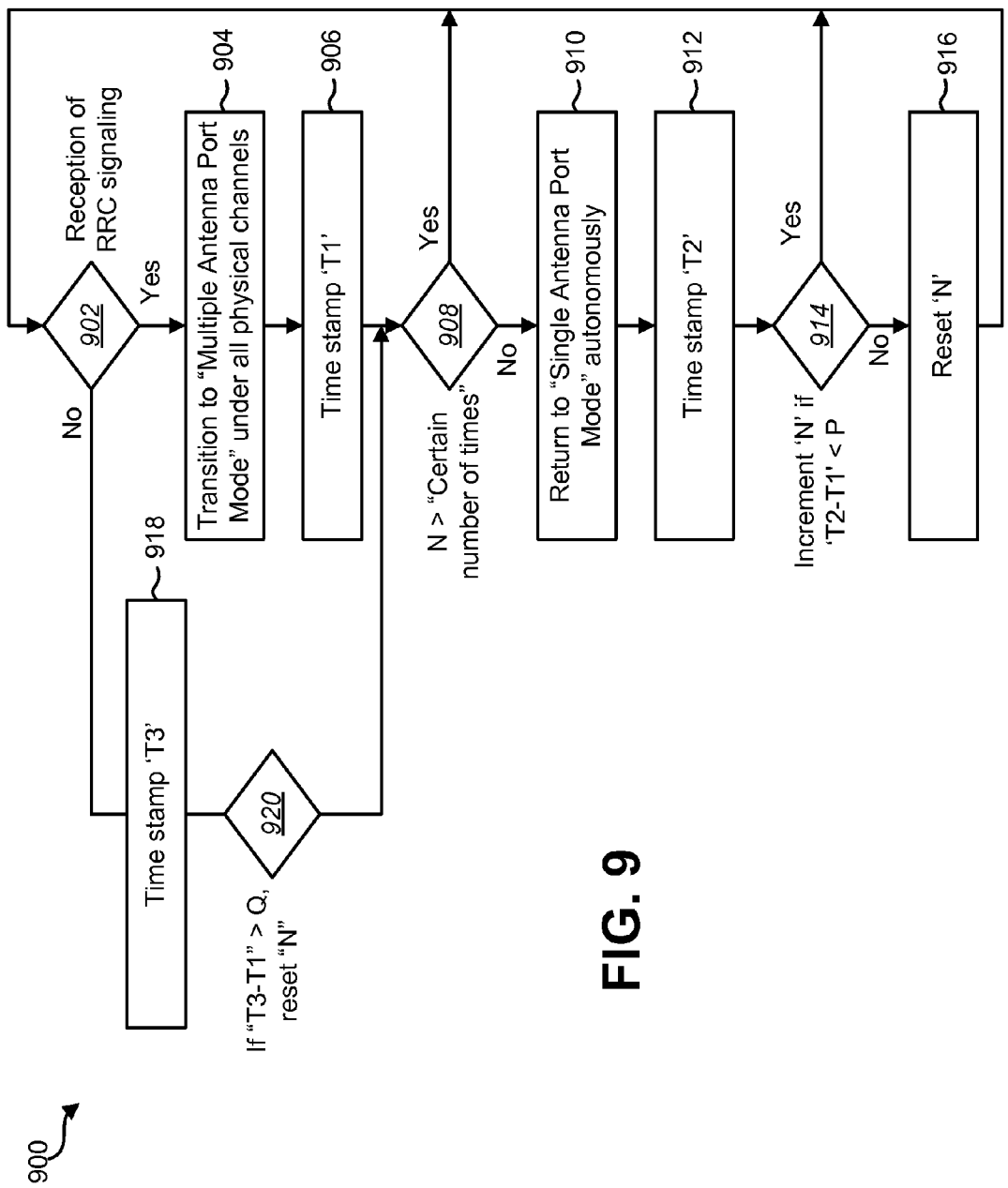
FIG. 9 illustrates a method whereby a wireless communication device may stop the autonomous transition to single antenna port mode under certain circumstances.

Reference is now made to FIG. 9. The method 900 of FIG. 9 illustrates how the wireless communication device 104 may stop the autonomous transition to the single antenna port mode 114a under certain circumstances. If the pattern of cycling between the base station's 102 instruction to transition to the multiple antenna port mode 114b and the wireless communication device 104 autonomously transitioning to the single antenna port mode 114a happens a certain number of times (which may be defined as a system parameter) during a certain time (which is shown as P in FIG. 9), then the wireless communication device 104 may cease to autonomously transition to the single antenna port mode 114a. The wireless communication device 104 may restart the autonomous transition to the single antenna port mode 114a after a certain time (which is shown as Q in FIG. 9).

More specifically, the wireless communication device 104 may determine 902 whether RRC signaling has been received. If it has, then the wireless communication device 104 may transition 904 to the multiple antenna port mode 114b for one or more physical channels. In addition, the wireless communication device 104 may create 906 a time stamp "T1". The wireless communication device 104 may then determine 908 whether N (which represents the number of times that the wireless communication device 104 has autonomously transitioned to the single antenna port mode 114a) exceeds a defined limit, which is shown as "certain number of times" in FIG. 9. If not, the wireless communication device 104 may autonomously return 910 to the single antenna port mode 114a. Time stamp "T2" may be created 912. In addition, the wireless communication device 104 may determine 914 whether T2−T1<P (where P represents a defined time period, as described above). If not, then the value of N may be reset 916, and the method 900 may return to step 902 and continue as described above.

If in step 908 it is determined that N does exceed the defined limit, then the method may return to step 902 (without returning 910 to the single antenna port mode 114a) and continue as described above. If in step 914 it is determined that T2−T1 is less than P, then the method 900 may return to step 902 (without resetting 914 N) and continue as described above. If in step 902 it is determined that RRC signaling has not been received, then the wireless communication device 104 may create 918 a time stamp "T3". The value of N may be reset 920 if T3−T1>Q (where Q represents a defined time period, as described above). The method 900 may then proceed to step 908, and continue as described above.

The base station 102 may detect the wireless communication device's 104 autonomous transition from the multiple antenna port mode 114*b* to the single antenna port mode 114*a*. For example, suppose that the base station 102 allocates multiple (e.g., two or four) codes 422 for the wireless communication device 104 in the multiple antenna port mode 114*b*. If the base station 102 detects that the SRS 112 was sent out on only one code 422*a* (as shown in FIG. 4(*b*)) even though the information at the base station 102 indicates that the wireless communication device 104 is in multiple antenna port mode 114*b*, the base station 102 may consider that the wireless communication device 104 has autonomously transitioned from the multiple antenna port mode 114*b* to the single antenna port mode 114*a*.

As another example, suppose that the base station 102 allocates multiple (e.g., two) RBs 524 for the wireless communication device 104 in the multiple antenna port mode 114*b*. If the base station 102 detects that the wireless communication device 104 is using only one RB 524*a* for PUCCH 110 (as shown in FIG. 5(*b*)) even though the information at the base station 102 indicates that the wireless communication device 104 is in multiple antenna port mode 114*b*, the base station 102 may consider that the wireless communication device 104 has autonomously transitioned from the multiple antenna port mode 114*b* to the single antenna port mode 114*a*.

Reference is now made to FIG. 10. The method 1000 of FIG. 10 illustrates that once the base station 102 detects 1002 that a first wireless communication device 104 has autonomously transitioned from the multiple antenna port mode 114*b* to the single antenna port mode 114*a*, the base station 102 may change 1004 the first wireless communication device's 104 status to single antenna port mode 114*a* and reallocate 1006 the part of the resources that are no longer being used by the first wireless communication device 104 to a second wireless communication device 104. For example, code #2 422*b* in FIG. 4 and/or RB #2 524*b* in FIG. 5 for the first wireless communication device 104 may be reallocated to the second wireless communication device 104 without any signaling to the first wireless communication device 104.

Reference is now made to FIG. 11. The method 1100 of FIG. 11 illustrates that once the base station 102 detects 1102 that a first wireless communication device 104 has autonomously transitioned from multiple antenna port mode 114*b* to single antenna port mode 114*a*, the base station 102 may change 1104 the status of the first wireless communication device 104 to single antenna port mode 114*a*. The base station 102 may schedule 1106 time/frequency resources and instruct modulation and coding scheme levels assuming that single input single output transmission (which implied by single antenna port mode 114*a*) were to be executed by the wireless communication device 104, unless and until the base station 102 determines to change the wireless communication device's 104 antenna port mode 114 from single 114*a* to multiple 114*b*, for objectives determined by its scheduling algorithm (e.g., revenue, capacity, optimization or other such measures).

The base station 102 may configure the wireless communication device 104 to transition from multiple antenna port mode 114*b* to single antenna port mode 114*a* via RRC signaling. The RRC signaling might include the PUSCH transmission mode. For example, referring to the method 1200 shown in FIG. 12, the base station 102 may inform 1202 a first wireless communication device 104 to transition to single antenna transmission mode 116*a* by using the PUSCH transmission mode parameter in RRC signaling. Then, the base station 102 may change 1204 the first wireless communication device's 104 status to single antenna port mode 114*a* and reallocate 1206 the part of resources that are no longer being used by the first wireless communication device 104 to a second wireless communication device 104.

Alternatively, referring to the method 1300 shown in FIG. 13, an explicit antenna port mode parameter may be configured via RRC signaling. The base station 102 may change 1302 the status of the first wireless communication device 104 to single antenna port mode 114*a*. The base station 102 may also configure 1304 the first wireless communication device's 104 antenna port mode 114 to single antenna port mode 114*a* by using an antenna port parameter via RRC signaling. Once the base station changes 1302 the first wireless communication device's 104 status, the base station 102 may reallocate 1306 the part of the resources that are no longer being used by the first wireless communication device 104 to a second wireless communication device 104.

The base station 102 may configure the wireless communication device 104 to transition from single antenna port mode 114*a* to multiple antenna port mode 114*b* via RRC signaling. For example, assuming case two 320 as illustrated in FIG. 3, the base station 102 may inform the wireless communication device 104 to transition to transmit diversity mode 116*b* or SU-MIMO mode (rank 1) 116*c* by using a PUSCH transmission mode parameter in RRC signaling.

Figures 14, 15:
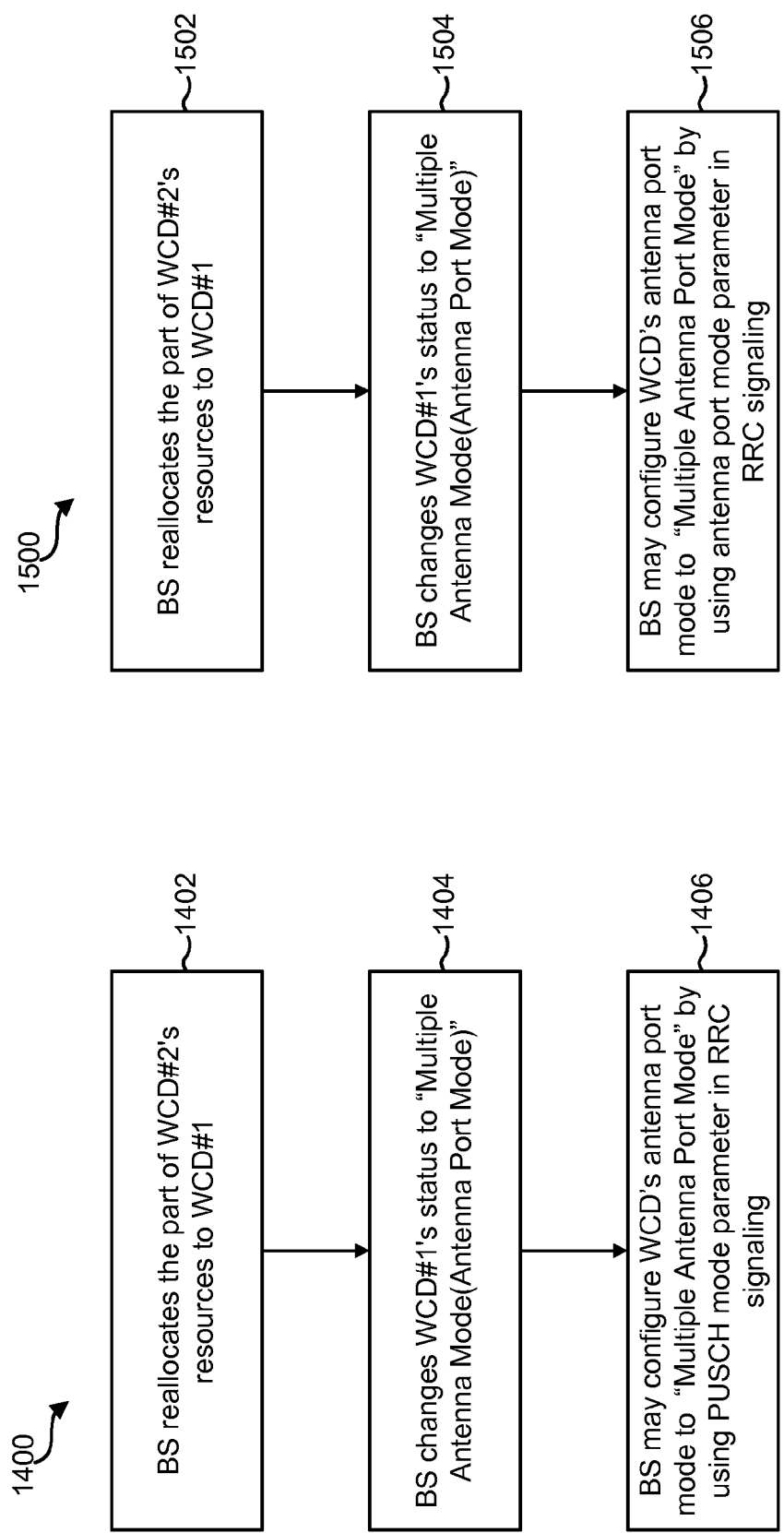
FIG. 14 illustrates a method whereby a base station may configure a wireless communication device to transition from single antenna port mode to multiple antenna port mode via RRC signaling.
FIG. 15 illustrates another method whereby a base station may configure a wireless communication device to transition from single antenna port mode to multiple antenna port mode via RRC signaling.

Referring to the method 1400 illustrated in FIG. 14, the base station 102 may reallocate 1402 a second wireless communication device's 104 resources to a first wireless communication device 104. For example, code #2 422*b* in FIG. 4 and/or RB #2 524*b* in FIG. 5 may be reallocated 1402 to the first wireless communication device 104. Then, the base station 102 may change 1404 the status of the first wireless communication device 104 to multiple antenna port mode 114*b*, and the base station 102 may instruct 1406 the wireless communication device 104 to transition to transmit diversity mode 116*b* or SU-MIMO mode (rank 1) 116*c* by using a PUSCH transmission mode parameter in RRC signaling.

Alternatively, assuming case one 218 as illustrated in FIG. 2 (where transmit diversity mode 116*b* and SU-MIMO mode (rank 1) 116*c* belong to both multiple antenna port mode 114*b* and single antenna port mode 114*a*), an explicit antenna port mode parameter may be configured via RRC signaling. Referring to the method 1500 illustrated in FIG. 15, the base station 102 may reallocate 1502 a second wireless communication device's 104 resources to a first wireless communication device 104. For example, code #2 422*b* in FIG. 4 and/or RB #2 524*b* in FIG. 5 may be reallocated 1502 to the first wireless communication device 104. Then, the base station 102 may change 1504 the status of the first wireless communication device 104 to multiple antenna port mode 114*b*, and the base station 102 may instruct 1506 the first wireless communication device 104 to transition to multiple antenna port mode 114*b* by using the antenna port mode parameter in RRC signaling.

In the cases where the wireless communication device 104 returns to a single antenna port mode 114*a* following instruction from the base station 102 to transition to multiple antenna port mode 114*b*, the base station 102 may schedule time/frequency resources and instruct modulation and coding scheme levels assuming single input single output transmission were to be executed by the wireless communication device 104. This may continue until the base station 102 determines to change the wireless communication device's 104 antenna port mode 114 from single 114*a* to multiple 114b, at which point the base station 102 may re-send an RRC command to re-establish multiple antenna port mode 114b.

Referring to the method 1600 illustrated in FIG. 16, the base station 102 may reallocate 1602 resources from a second wireless communication device 104 to a first wireless communication device 104. Then, the base station 102 may change 1604 the status of the first wireless communication device 104 to multiple antenna port mode 114b, and the base station 102 may instruct 1606 the first wireless communication device 104 to transition to multiple antenna port mode 114b by using the antenna port mode parameter in RRC signaling. When the wireless communication device's 104 autonomous transition to single antenna port mode 114a is detected 1608, the method 1600 may return to step 1604 and continue as described above.

Another aspect of the systems and methods disclosed herein relates to uplink transmit power control for supporting multiple antenna transmission modes and multiple physical channels. Referring to the method 1700 illustrated in FIG. 17, an uplink power control procedure may include two steps. The first step is defining 1702 the total transmission power for each component carrier (CC). The second step is defining 1704 how to allocate the transmission power to each antenna 106. The wireless communication device 104 may perform both the first step 1702 and the second step 1704. The base station 102 may only perform the first step 1702. The second step 1704—allocation of transmission power to each antenna 106—may be different depending on whether the wireless communication device 104 is in the single antenna port mode 114a or the multiple antenna port mode 114b, and it may depend on the power amplifier (PA) configuration.

Figure 18:
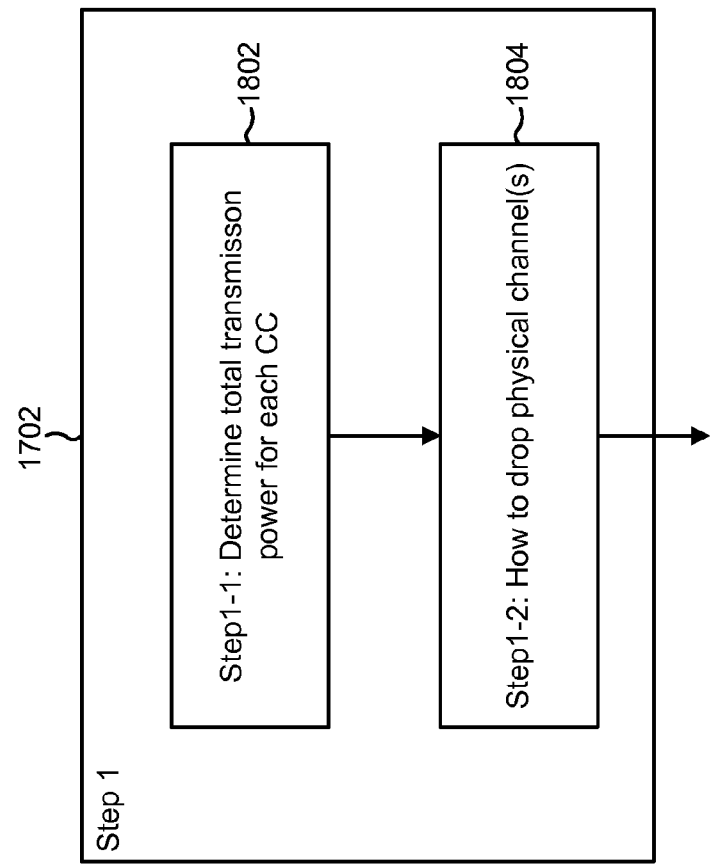
FIG. 18 illustrates additional details about one aspect of the uplink power control procedure illustrated in FIG. 17.

FIG. 18 illustrates the details of step one 1702 (i.e., defining the total transmission power for each CC). As shown in FIG. 18, step one 1702 may include two sub-steps 1802, 1804. The first sub-step is to determine 1802 the total transmission power for each CC. The second sub-step 1804 is to determine whether to drop any physical channel(s). In some cases, the second sub-step 1804 may be skipped.

The details of the first sub-step 1802 depend on the physical channel. For PUSCH 108, the transmission power for each CC may be defined by equation (1):

$$P_{PUSCH}(i,k) = \min\{P_{MAX}, 10 \cdot \log_{10} M_{PUSCH}(i,k) + \quad (1)$$
$$P_{0\_PUSCH}(k) + \alpha(k) \cdot PL(k) + \Delta_{TF}(i,k) + f(i,k)\}$$

Equation (1) is expressed in units of dBm. In equation (1), k is the uplink CC number, and i is the subframe number. $P_{MAX}$ is the total maximum allowed power. $M_{PUSCH}(i,k)$ is the number of, contiguous or non-contiguous, PRBs in UL CC k. $P_{0\_PUSCH}(k)$ is the sum of cell-specific ($P_{O\_NOMINAL\_PUSCH}(k)$) and wireless communication device-specific ($P_{O\_UE\_PUSCH}(k)$) components. $\alpha(k)$ is the fractional TPC cell-specific parameter for UL CC k with $0 \le \alpha(k) \le 1$. PL(k) is the downlink path-loss estimate for downlink CC k. The expression $\Delta_{TF}(i,k) = 10 \cdot \log_{10}(2^{K_s(k) \cdot TBS(i,k)/N_{RE}(i,k)} - 1)$ where $K_s(k) = 0$ or 1.25, TBS(i,k) is the TB size, and $N_{RE}(i,k) = M_{PUSCH}(i,k) \cdot N_{sc}^{RB} \cdot N_{symb}^{PUSCH}(i,k)$. The expression $f(i,k) = f(i-1,k) + \delta_{PUSCH}(i,k)$ is the function accumulating the CL TPC command $\delta_{PUSCH}(i,k)$ during subframe i with f(0,k) being the first value after reset of accumulation.

For PUCCH 110, the transmission power for each CC may be defined by equation (2):

$$P_{PUCCH}(i,k) = \quad (2)$$
$$\min\{P_{MAX}, 10 \cdot \log_{10} M_{PUCCH}(i,k) + P_{0\_PUCCH}(k) + PL(k) +$$
$$h(\cdot) + \Delta_{F\_PUCCH}(F) + g(i,k)\}$$

Equation (2) is expressed in units of dBm. In equation (2), k is the uplink CC number, and i is the subframe number. $M_{PUCCH}(i,k)$ is the number of orthogonal resources allocated for PUCCH in UL CC k. $P_{0\_PUCCH}(k)$ is the sum of cell-specific ($P_{O\_NOMINAL\_PUCCH}(k)$) and wireless communication device-specific ($P_{O\_UE\_PUCCH}(k)$) components. PL(k) is the estimated path loss in UL k. The expression $h(\cdot)$ is a PUCCH format dependent value. The expression $\Delta_{F\_PUCCH}(F)$ corresponds to PUCCH format (F), relative to format 1a. The expression g(i,k) is the function accumulating the CL TPC commands in CC k.

The orthogonal resources for PUCCH may mean orthogonal code and frequency resources which are allocated for a specific wireless communication device. Orthogonal codes include Zadoff-Chu sequences and orthogonal covering (e.g., Walsh code). Frequency resources means resource blocks, in the parlance of 3GPP LTE Release 8. Therefore, if two different Zadoff-Chu sequences and the same RB were allocated for a wireless communication device, it may be said that two orthogonal resources are allocated for the wireless communication device. If the same Zadoff-Chu sequence and two different RBs were allocated for a wireless communication device, it may be said that two orthogonal resources are allocated for the wireless communication device.

In another example, for PUCCH 110, the transmission power for each CC may be defined by equation (2-1):

$$P_{PUCCH}(i,k) = \quad (2-1)$$
$$\min\{P_{MAX}, P_{0\_PUCCH}(k) + PL(k) + h(\cdot) + \Delta_{F\_PUCCH}(F) + g(i,k)\}$$

Equation (2-1) is expressed in units of dBm. In equation (2-1), k is the uplink CC number, and i is the subframe number. $P_{0\_PUSCH}(k)$ is the sum of cell-specific ($P_{O\_NOMINAL\_PUCCH}(k)$) and wireless communication device-specific ($P_{O\_UE\_PUCCH}(k)$) components. PL(k) is the estimated path loss in UL k. The expression $h(\cdot)$ is a PUCCH format-dependent value. The expression $\Delta_{F\_PUCCH}(F)$ corresponds to PUCCH format (F), relative to format 1a. The expression g(i,k) is the function accumulating the CL TPC commands in CC k.

For SRS 112, the transmission power for each CC may be defined by equation (3):

$$P_{SRS}(i,k) = \min\{P_{MAX}, P_{SRS\_OFFSET}(k) + \quad (3)$$
$$10 \cdot \log_{10} M_{SRS}(k) + P_{0\_PUSCH}(k) + \alpha(k) \cdot PL(k) + f(i,k)\}$$

Equation (3) is expressed in units of dBm. In equation (3), k is the uplink CC number, and i is the subframe number. $P_{SRS\_OFFSET}(k)$ is a wireless communication device-specific parameter. $M_{SRS}(k)$ is the SRS transmission bandwidth, in PRBs, in uplink CC k. The remaining parameters are as defined for PUSCH transmission in UL CC k.

Figure 19:
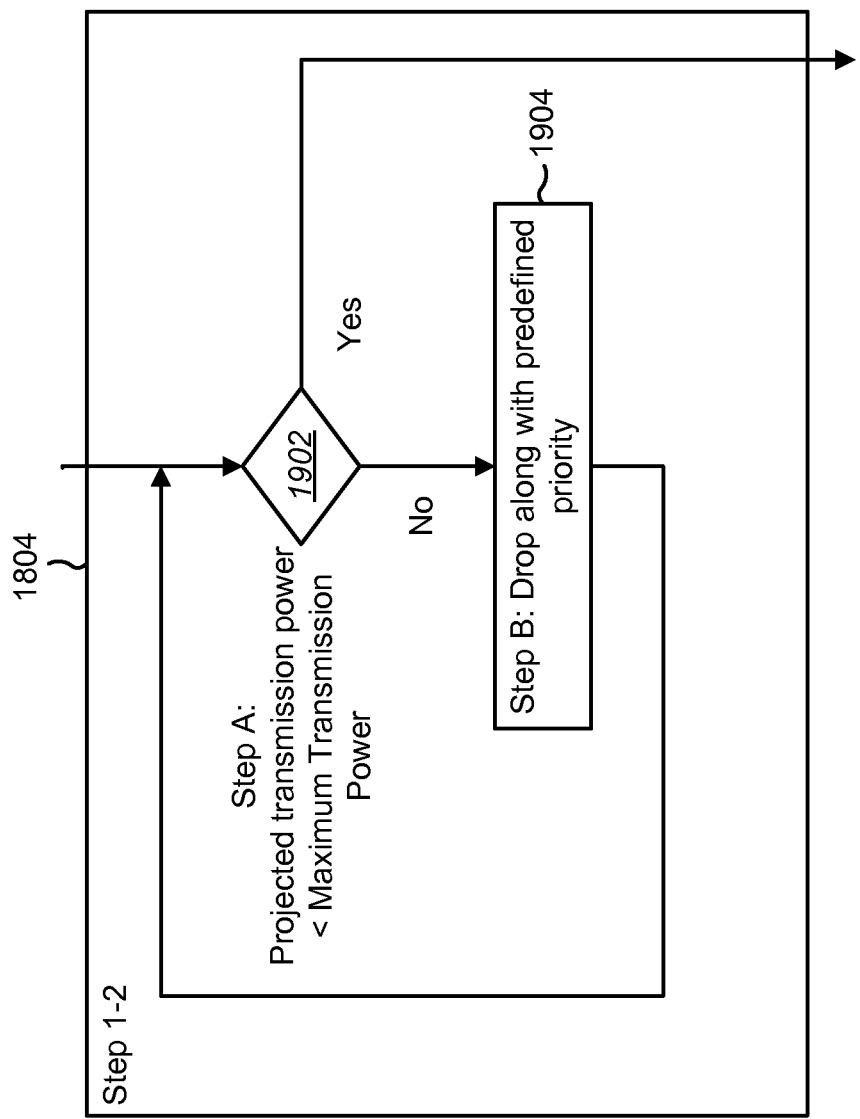
FIG. 19 illustrates additional details about another aspect of the uplink power control procedure illustrated in FIG. 17.

Referring to FIG. 19, the details of the second sub-step 1804 (i.e., determining how to drop physical channel(s)) are illustrated. The projected transmission power and the maximum transmission power may be compared 1902. If the projected transmission power is smaller than the maximum transmission power, then the method may proceed to step two 1704. Otherwise, the physical channel is dropped 1904 based on the predefined priority. Then the method returns to comparing 1902 the projected transmission power and the maximum transmission power.

For purposes of comparing 1902 the projected transmission power and the maximum transmission power, the definition of "projected transmission power" may be as follows.

$$Projected transmission power(i, n_{ns}, l) = \qquad (4)$$
$$\sum_k \{n_{PUSCH}(i, n_{ns}, l, k) \cdot P_{PUSCH}(i, k) +$$
$$n_{PUCCH}(i, n_{ns}, l, k) \cdot P_{PUCCH}(i, k) n_{SRS}(i, n_{ns}, l, k) \cdot P_{SRS}(i, k)\}$$

The maximum transmission power may be defined by the total transmission power. The maximum transmission power may be defined by the power class of the wireless communication device 104 (which may be constrained by government regulations). For example, the maximum transmission power may be 23 dBm, 21 dBm, 25 dBm, etc.

In equation (4), $n_{PUSCH}$, $n_{PUCCH}$ and $n_{SRS}$ stand for the following. The expression $n_{PUSCH}(i,n_{ns},l,k)=1$ if PUSCH 108 is allocated on a specific symbol (on ith subframe, $n_{ns}$ slot, lth symbol and kth component carrier). The expression $n_{PUSCH}(i,n_{ns},l,k)=0$ if PUSCH 108 is not allocated on a specific symbol (on ith subframe, $n_{ns}$ slot, lth symbol and kth component carrier). The expression $n_{PUCCH}(i,n_{ns},l,k)=1$ if PUCCH 110 is allocated on a specific symbol (on ith subframe, $n_{ns}$ slot, lth symbol and kth component carrier). The expression $n_{PUCCH}(i,n_{ns},l,k)=0$ if PUCCH 110 is not allocated on a specific symbol (on ith subframe, $n_{ns}$ slot, lth symbol and kth component carrier). The expression $n_{PUSCH}(i,n_{ns},l,k)=1$ if SRS 112 is allocated on a specific symbol (on ith subframe, $n_{ns}$ slot, lth symbol and kth component carrier). The expression $n_{PUSCH}(i,n_{ns},l,k)=0$ if SRS 112 is not allocated on a specific symbol (on ith subframe, $n_{ns}$ slot, lth symbol and kth component carrier).

Figure 20:
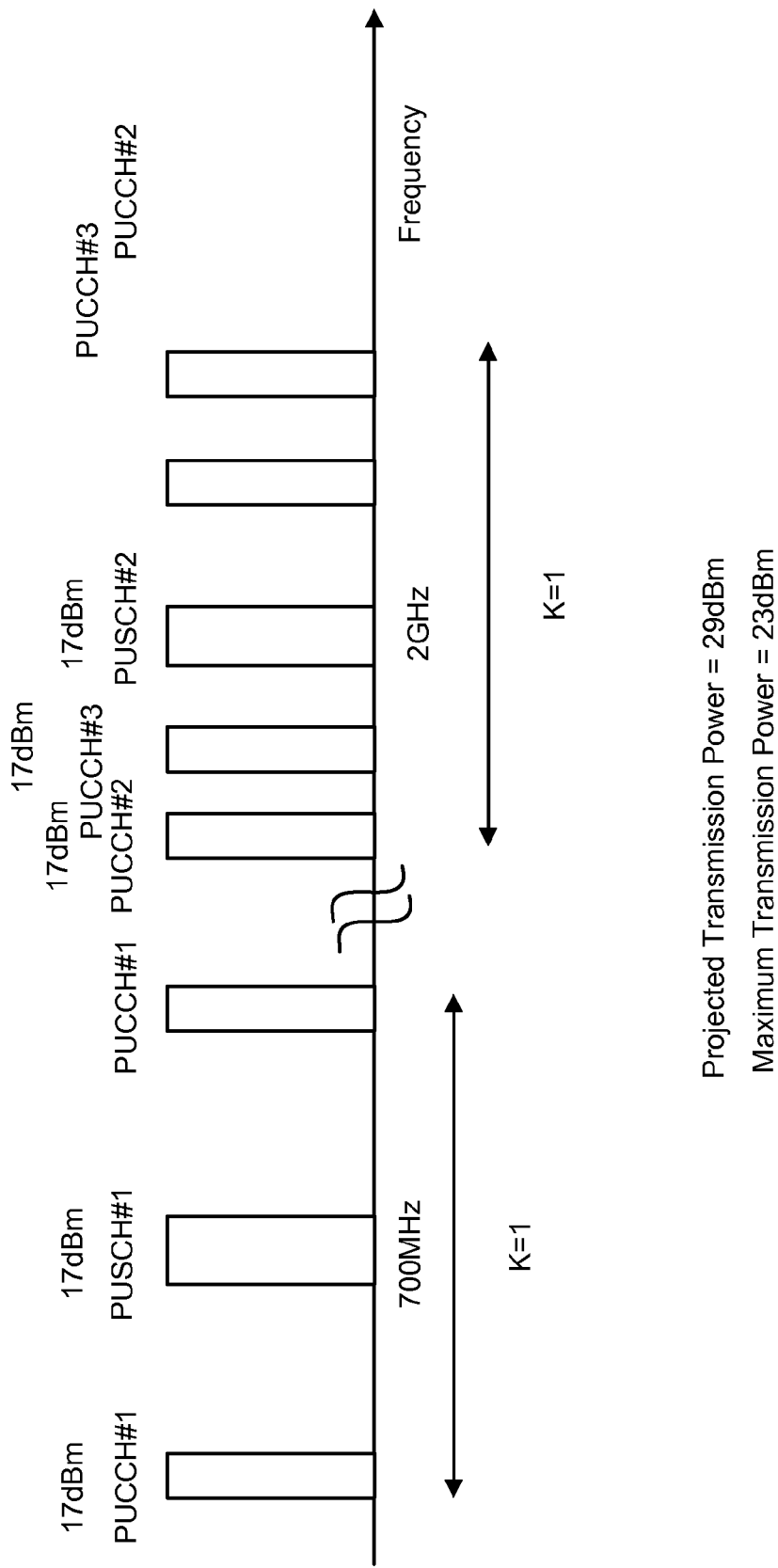
FIG. 20 illustrates an example of transmission power allocation before the step of determining whether to drop physical channels is performed.
Figure 21:
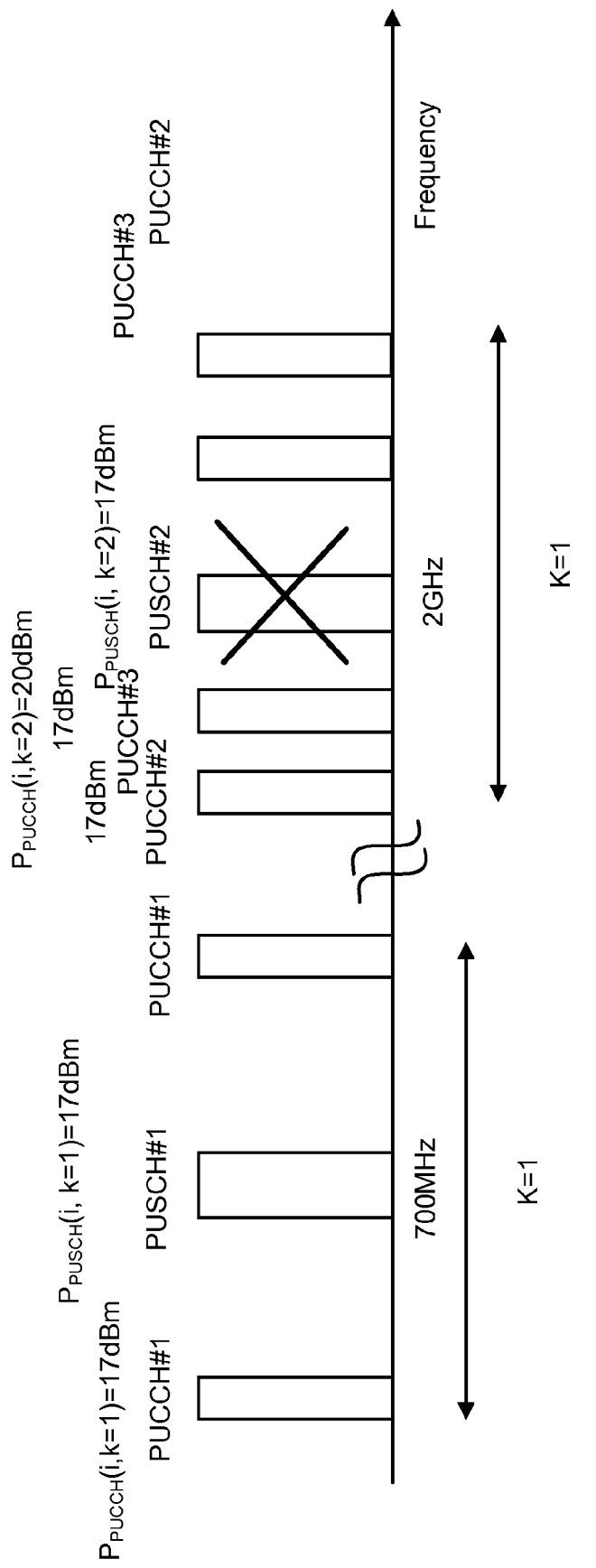
FIG. 21 illustrates an example of transmission power allocation after the step of determining whether to drop physical channels is performed.

The predefined order of the physical channel priority may be as follows. In general, the order could be any permutation of the physical channels or as determined by base station scheduling and control. In one example, PUCCH low frequency>>>PUCCH high frequency>PUSCH low frequency>>PUSCH high frequency. In another example, PUCCH low frequency>>PUSCH low frequency>>PUCCH high frequency>>PUSCH high frequency In another example, PUCCH low frequency>>>PUCCH high frequency>SRS low frequency>>SRS high frequency. In another example, PUCCH low frequency>>>PUCCH high frequency>SRS low frequency>>SRS high frequency>>>PUSCH low frequency>>PUSCH high frequency. In another example, SRS low frequency<<PUCCH low frequency<<PUSCH low frequency<<SRS high frequency<<PUCCH high frequency<<PUSCH low frequency>>PUSCH high frequency. Based on this order, some physical channels may be dropped until the projected transmission power becomes less than the maximum transmission power. One example is shown in FIGS. 20 and 21. FIG. 20 illustrates the transmission power allocation before the step of determining 1804 whether to drop physical channels is performed. FIG. 21 illustrates the transmission power allocation after this step 1804 is performed.

If the uplink power control procedure described above is applied, the base station 102 can ignore the power amplifier (PA) configuration of the wireless communication device 104 for purposes of power control, even though each wireless communication device 104 may have a different PA configuration. In other words, power control can be independent of the PA configuration. Therefore, less signaling is required in the transition between single antenna port mode 114*a* and multiple antenna port mode 114*b*. Also, since there is a common power control equation between single antenna port mode 114*a* and multiple antenna port mode 114*b*, there may not be a rapid power change between them.

A wireless communication device may have both step one 1702 and step two 1704 in its uplink power control procedure. The base station 102 may have only step one 1702 in its uplink power control procedure. The base station 102 can ignore the PA configuration and the antenna port mode 114 of the wireless communication device 104 in its uplink power control procedure.

Figure 22:
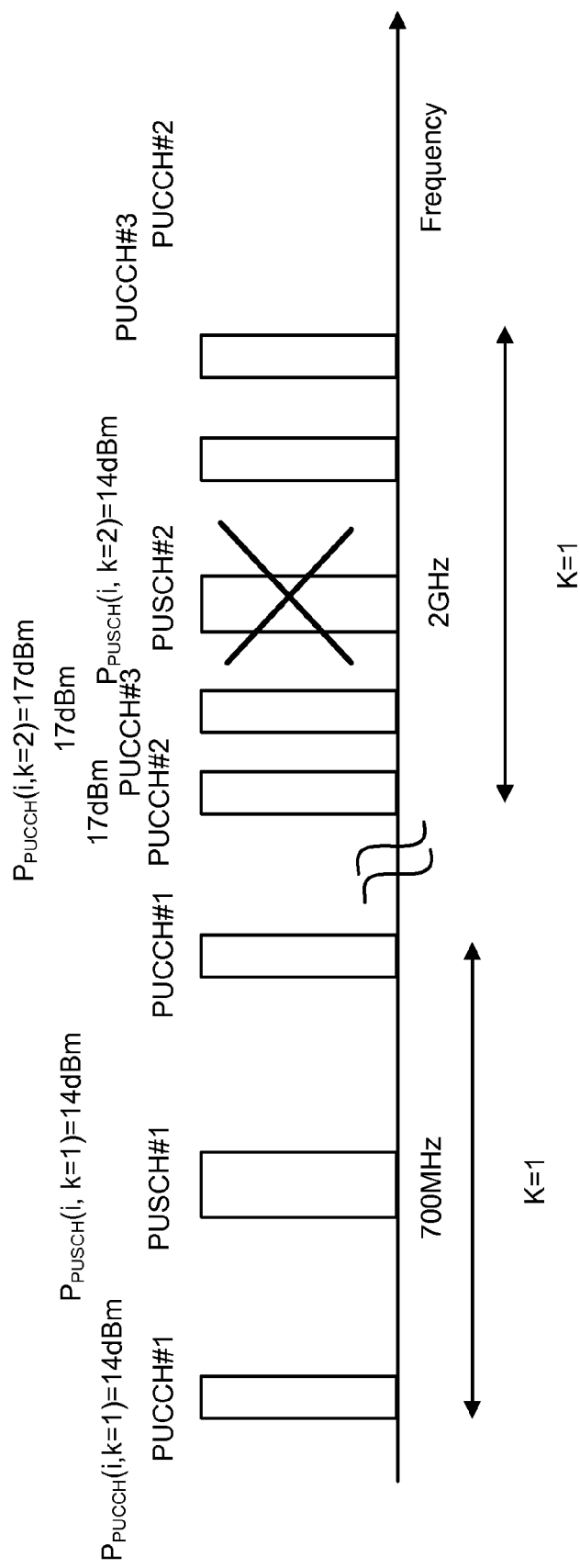
FIG. 22 illustrates an example of transmission power allocation for the two 20 dBm power amplifier configuration case.
Figure 23A:
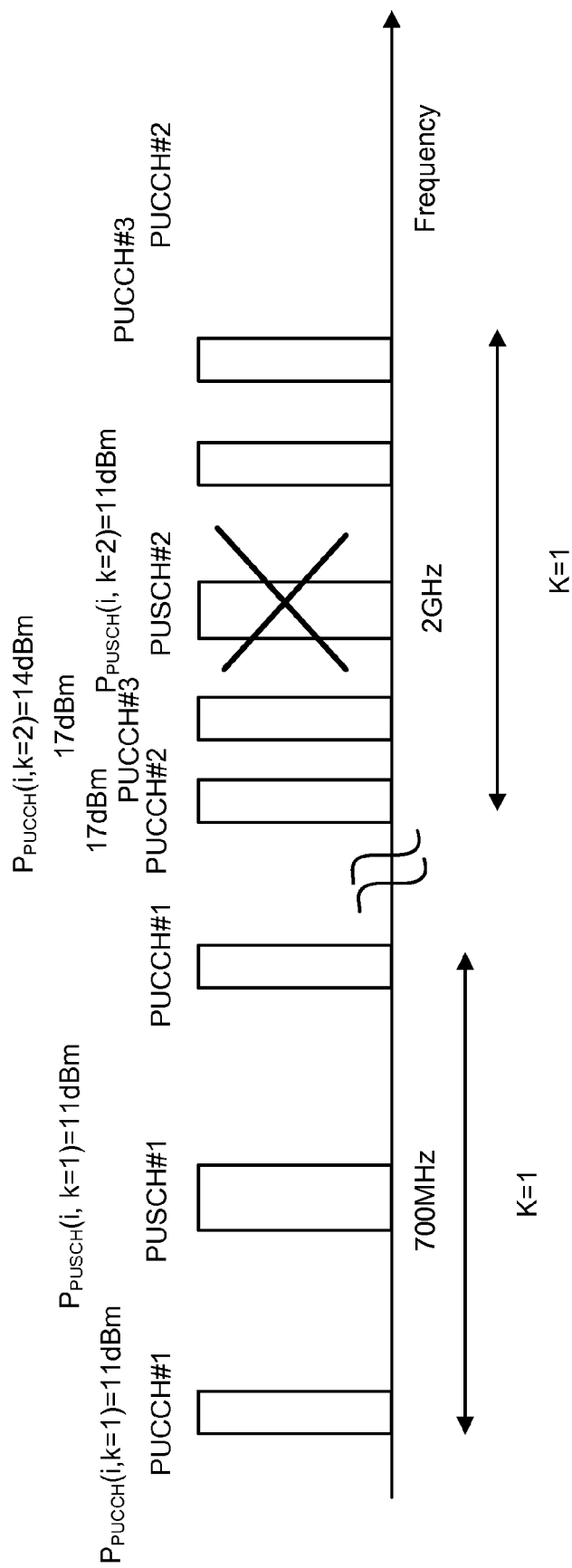
FIG. 23A illustrates an example of transmission power allocation for the four 17 dBm PA configuration case.

In single antenna port mode 114*a*, depending on the PA configuration, allocation of transmission power is different between the antennas 106*a*, 106*b*. For example, in the two or four 23 dBm PA configuration case, single antenna port mode 114*a* may use only one PA physically. In other words, the same transmission power as shown in FIG. 21 for one antenna 106*a* will be allocated. For the remaining antenna 106*b*, no power will be allocated. In the two 20 dBm PA configuration case, single antenna port mode 114*a* may use two PAs physically and the allocated transmission power for each antenna 106*a*, 106*b* may be as shown in FIG. 22. In the four 17 dBm PA configuration case, the single antenna port mode 114*a* may use two PAs physically and the allocated transmission power for each antenna 106 may be as shown in FIG. 23A. In multiple antenna port mode 114*b*, for the two antenna 106*a*, 106*b* case, one-half of the transmission power may be allocated to each antenna 106, as shown in FIG. 22. One-quarter of the transmission power may be allocated to each antenna 106 in the four antenna 106 case, as shown in FIG. 23A. In the example illustrated in FIG. 23A, K indicates that there a single power amplifier (PA) is used for both illustrated bands. That is, K has a common value (i.e., K=1) across both bands.

Figure 23B:
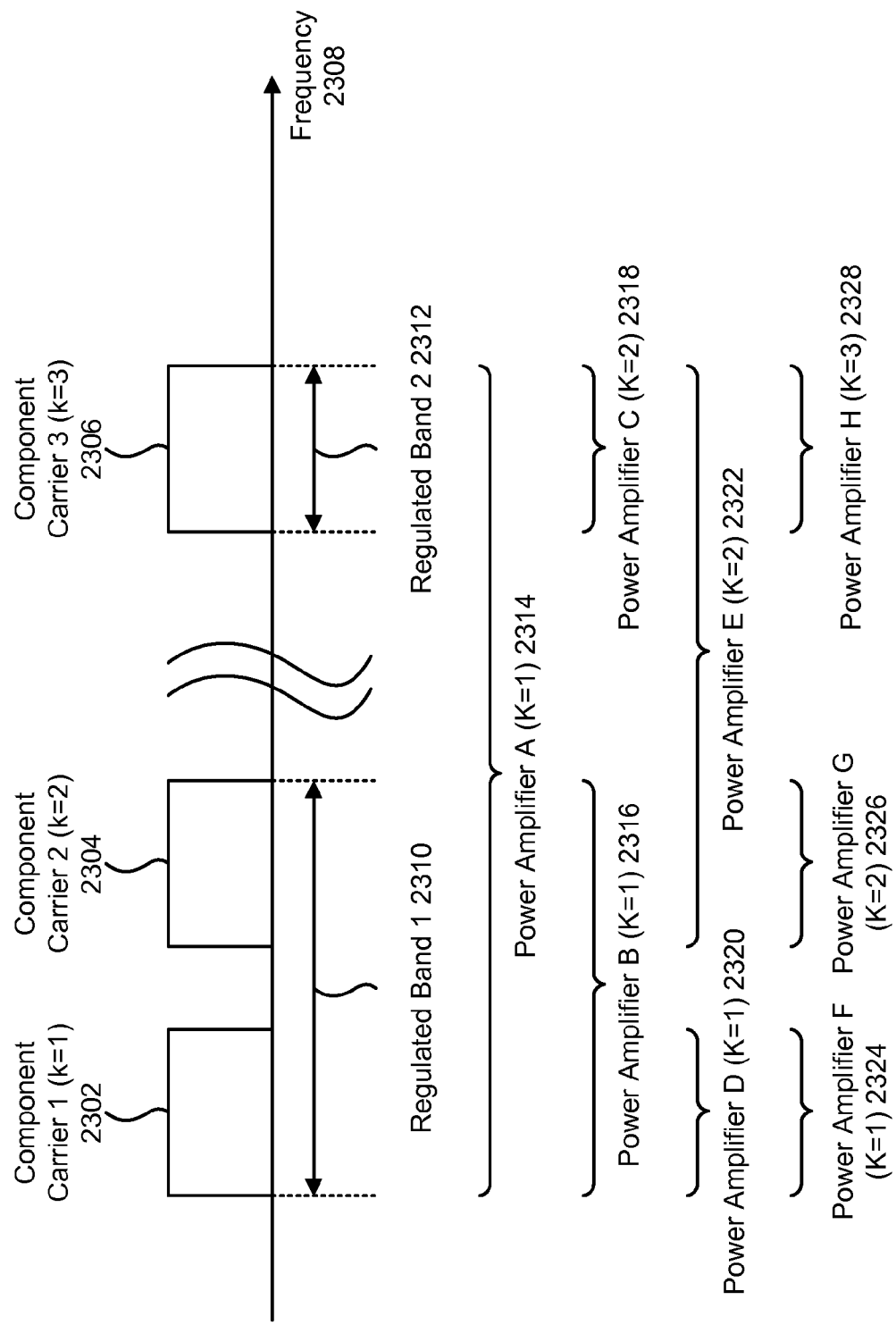
FIG. 23B is a diagram illustrating one example of a plurality of regulated frequency bands and component carriers.

FIG. 23B is a diagram illustrating one example of a plurality of regulated frequency bands and component carriers. This diagram illustrates three component carriers 2302, 2304, 2306 and two frequency "chunks" or regulated frequency bands 2310, 2312 along a frequency scale 2308. Component carrier 1 2302, component carrier 2 2304 and component carrier 3 2306 are indicated by k=1, k=2 and k=3 respectively. Component carrier 1 2302 and component carrier 2 2304 are located in regulated band 1 2310. Component carrier 3 2306 is located in regulated band 2 2312 in a higher frequency 2308 range. For example, regulated band 1 2310 could be a frequency band in the 800 MHz range while regulated band 2 2312 could be a frequency band in the 2 GHz range.

FIG. 23B also illustrates several examples of wireless communication device configurations. In particular, several different power amplifier arrangements are shown. In these examples, K indicates different power amplifiers. For example, power amplifier A (K=1) 2314 provides signal amplification for both regulated band 1 2310 and regulated band 2 2312. Thus, power amplifier A (K=1) 2314 provides signal amplification for component carrier 1 2302, component carrier 2 2304 and component carrier 3 2306. In other words, the wireless communication device 104 may be configured such that a single power amplifier provides signal amplification for all of the transmitted frequency bands.

In another configuration, power amplifier B (K=1) 2316 amplifies regulated band 1 2310 (e.g., and hence, component carrier 1 2302 and component carrier 2 2304) while power amplifier C (K=2) 2318 amplifies regulated band 2 2312 (e.g., and component carrier 3 2306). Thus, the wireless communication device 104 may be configured such that a separate power amplifier is provided for each regulated frequency band having one or more component carriers (e.g., the wireless communication device may include multiple power amplifiers).

In yet another configuration, a power amplifier may amplify separate component carriers in different regulated frequency bands. For example, power amplifier E (K=2) 2322 may provide signal amplification for component carrier 2 2304 (e.g., in regulated band 1 2310) and component carrier 3 2306 (e.g., in regulated band 2 2312). Power amplifier D (K=1) 2320 may be provided for component carrier 1 2302.

In another configuration, separate power amplifiers may be provided for each component carrier. In an example configuration, power amplifier F (K=1) 2324 provides signal amplification for component carrier 1 2302, while power amplifier G (K=2) 2326 amplifies component carrier 2 2304 and power amplifier H (K=3) 2328 amplifies component carrier 3 2306. Thus, FIG. 23B illustrates that if each regulated band and/or component carrier uses separate power amplifiers indicated by separate K values, then each power amplifier provides signal amplification for each regulated band and/or component carrier.

Figure 17:
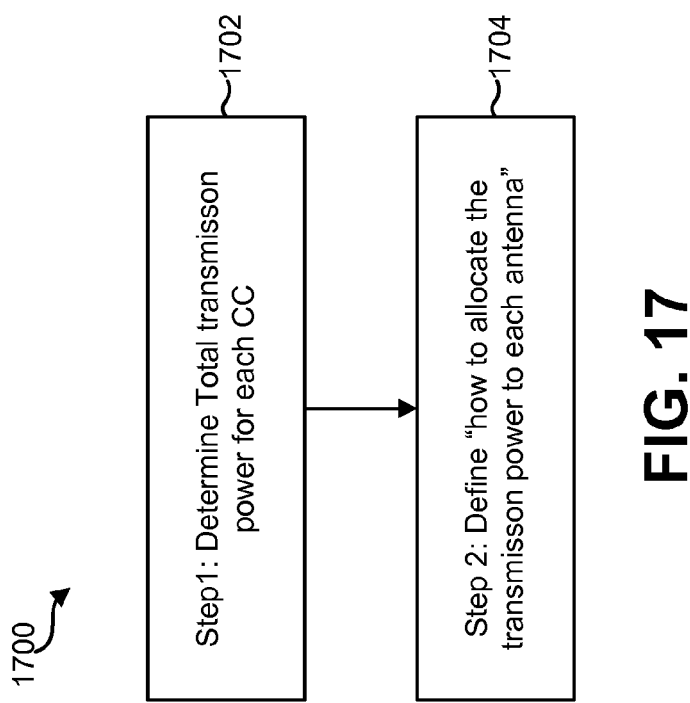
FIG. 17 illustrates an uplink power control procedure.
Figure 23C:
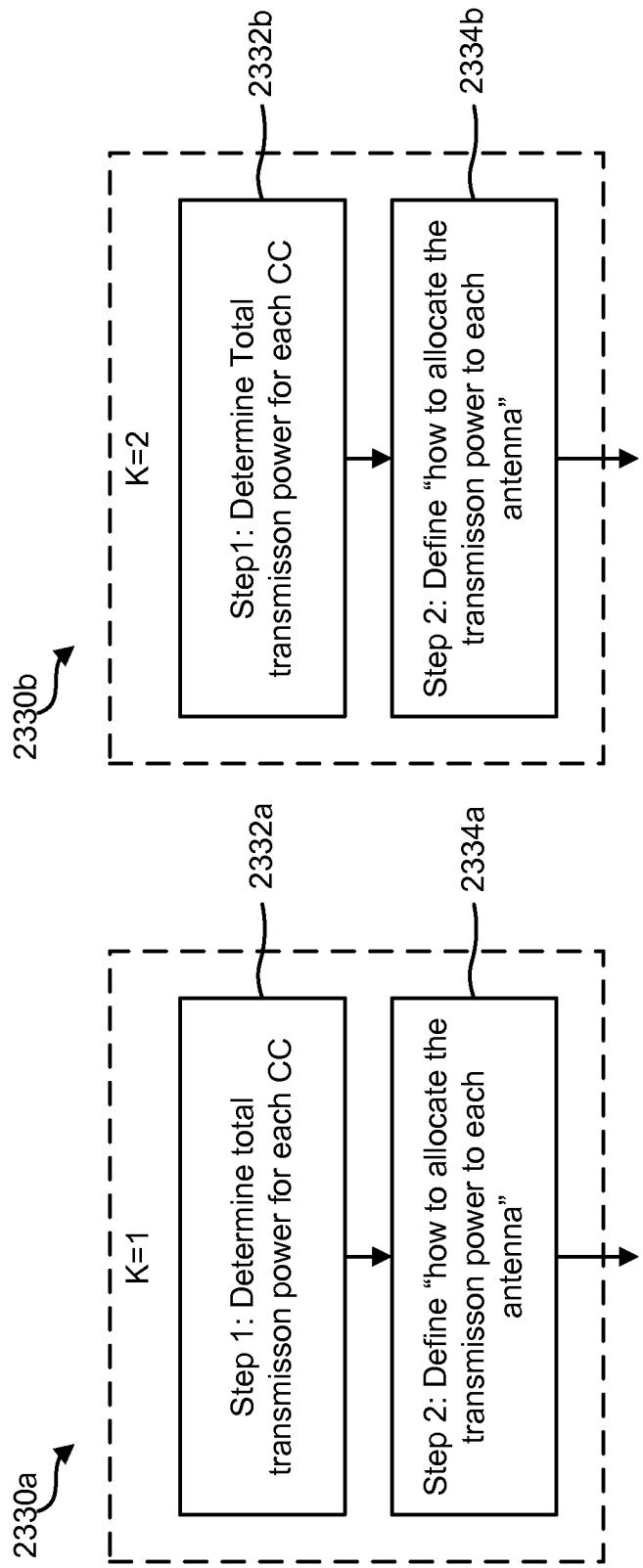
FIG. 23C is a flow diagram illustrating one configuration of a method for performing uplink transmission power control for a plurality of regulated frequency bands.

FIG. 23C is a flow diagram illustrating one configuration of a method 2330 for performing uplink transmission power control for a plurality of regulated frequency bands. In this configuration, the method illustrated in FIG. 17 is performed for multiple regulated bands. For example, a wireless communication device 104 determines 2332*a* a total transmission power for each component carrier (CC) which is indicated by K=1. The wireless communication device 104 then allocates 2334*a* transmission power to each antenna 106. This procedure may then repeat 2330*b* for K=2. That is, for K=2, the wireless communication device 104 may determine 2332*b* the total transmission power for each component carrier (CC) and then allocate 2334*b* transmission power to each antenna 106. For more specificity, step 1 2332*a-b* in FIG. 23C for each regulated band or component carrier may be the same procedure that is carried out in step 1 1702 of FIG. 17. Step 2 2334*a-b* in FIG. 23C may be the same procedure carried out in step 2 1704 of FIG. 17.

Figure 23D:
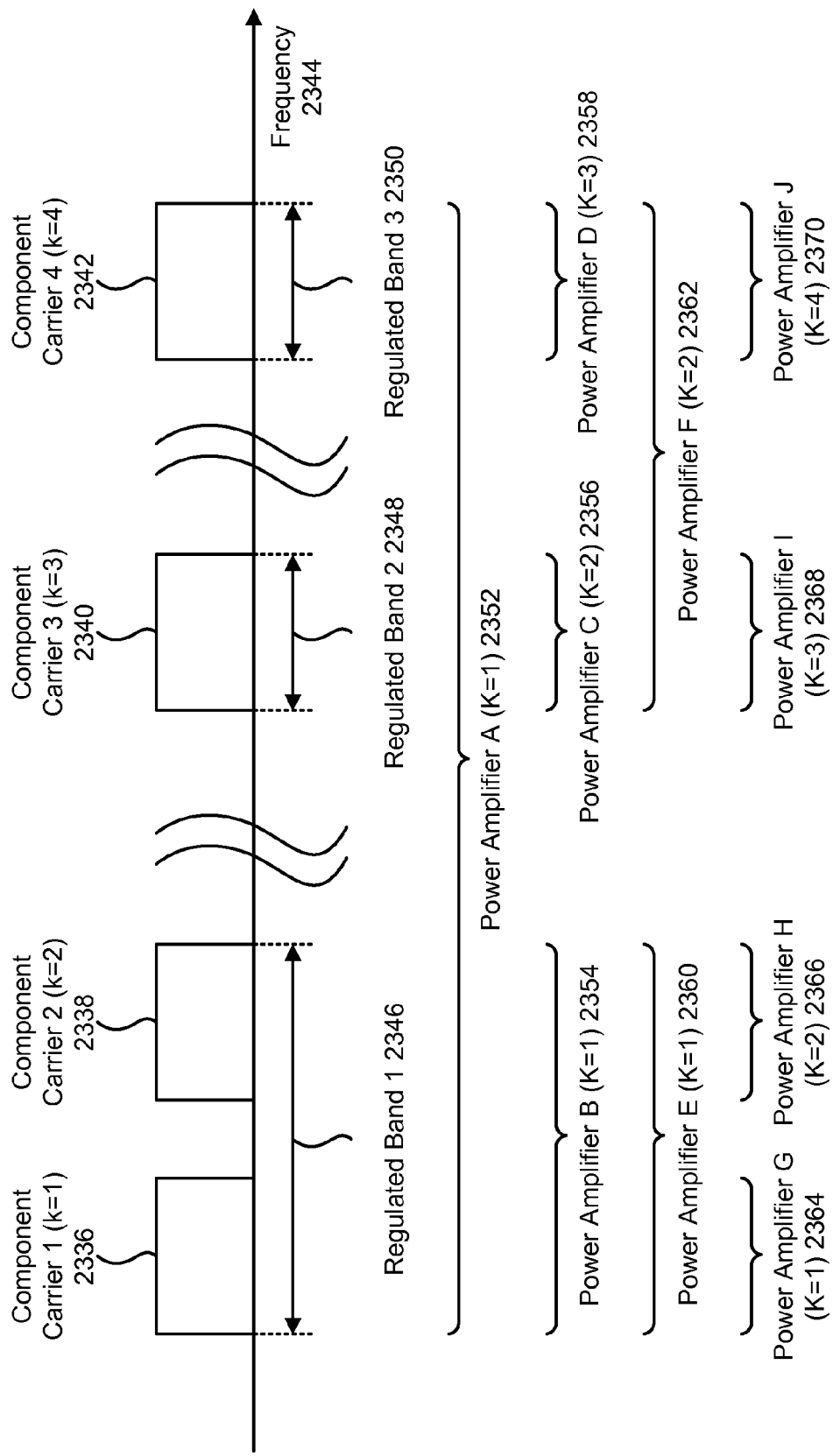
FIG. 23D is a diagram illustrating another example of a plurality of regulated frequency bands and component carriers.

FIG. 23D is a diagram illustrating another example of a plurality of regulated frequency bands and component carriers. In this example, four component carriers 2336, 2338, 2340, 2342 (k=1-4) and three regulated bands 2346, 2348, 2350 are illustrated along a frequency scale 2344. In this case, component carrier 1 (k=1) 2336 and component carrier 2 (k=2) 2338 are included in regulated band 1 2346. Regulated band 2 2348 includes only component carrier 3 (k=3) 2340 and regulated band 3 2350 includes only component carrier 4 (k=4) 2342. Regulated band 1 2346 may be in an 800 MHz frequency range, regulated band 2 2348 may be in a 1.7 GHz frequency range and regulated band 3 2350 may be in a 2 GHz frequency range, for example.

In one configuration, power amplifier A (K=1) 2352 may be a single power amplifier that provides signal amplification for all of the regulated bands 2346, 2348, 2350 and hence, all of the component carriers (k=1-4) 2336, 2338, 2340, 2342. In other configurations, multiple power amplifiers may be used to power individual or multiple component carriers and/or regulated bands. For instance, power amplifier B (K=1) 2354 may provide signal amplification for regulated band 1 2346 (i.e., and hence, for component carrier 1 (k=1) 2336 and component carrier 2 (k=2) 2338). Regulated band 2 2348 may use power amplifier C (K=2) 2356 while regulated band 3 2350 uses power amplifier D (K=3) 2358.

In another configuration, a single power amplifier may provide amplification for multiple component carriers on separate regulated frequency bands. For example, power amplifier F (K=2) 2362 may be used to amplify signals on component carrier 3 (k=3) 2340 and component carrier 4 (k=4) 2342, which are separated between regulated band 2 2348 and regulated band 3 2350. Power amplifier E (K=1) 2360, for example, may be used to amplify regulated band 1 2346 (e.g., and thus component carrier 1 (k=1) 2336 and component carrier 2 (k=2) 2338).

In yet another configuration, a separate power amplifier may be used for each individual component carrier. In this example, component carrier 1 (k=1) 2336 uses power amplifier G (K=1) 2364, component carrier 2 (k=2) 2338 uses power amplifier H (K=2) 2366, component carrier 3 (k=3) 2340 uses power amplifier I (K=3) 2368 and component carrier 4 (k=4) 2342 uses power amplifier J (K=4) 2370. Although only several possible configurations are illustrated in FIG. 23D, several other configurations of power amplifiers may be used between regulated bands and component carriers. Thus, FIG. 23D illustrates that if each regulated band and/or component carrier uses separate power amplifiers indicated by separate K values, then each power amplifier provides signal amplification for each regulated band and/or component carrier.

Figure 23E:
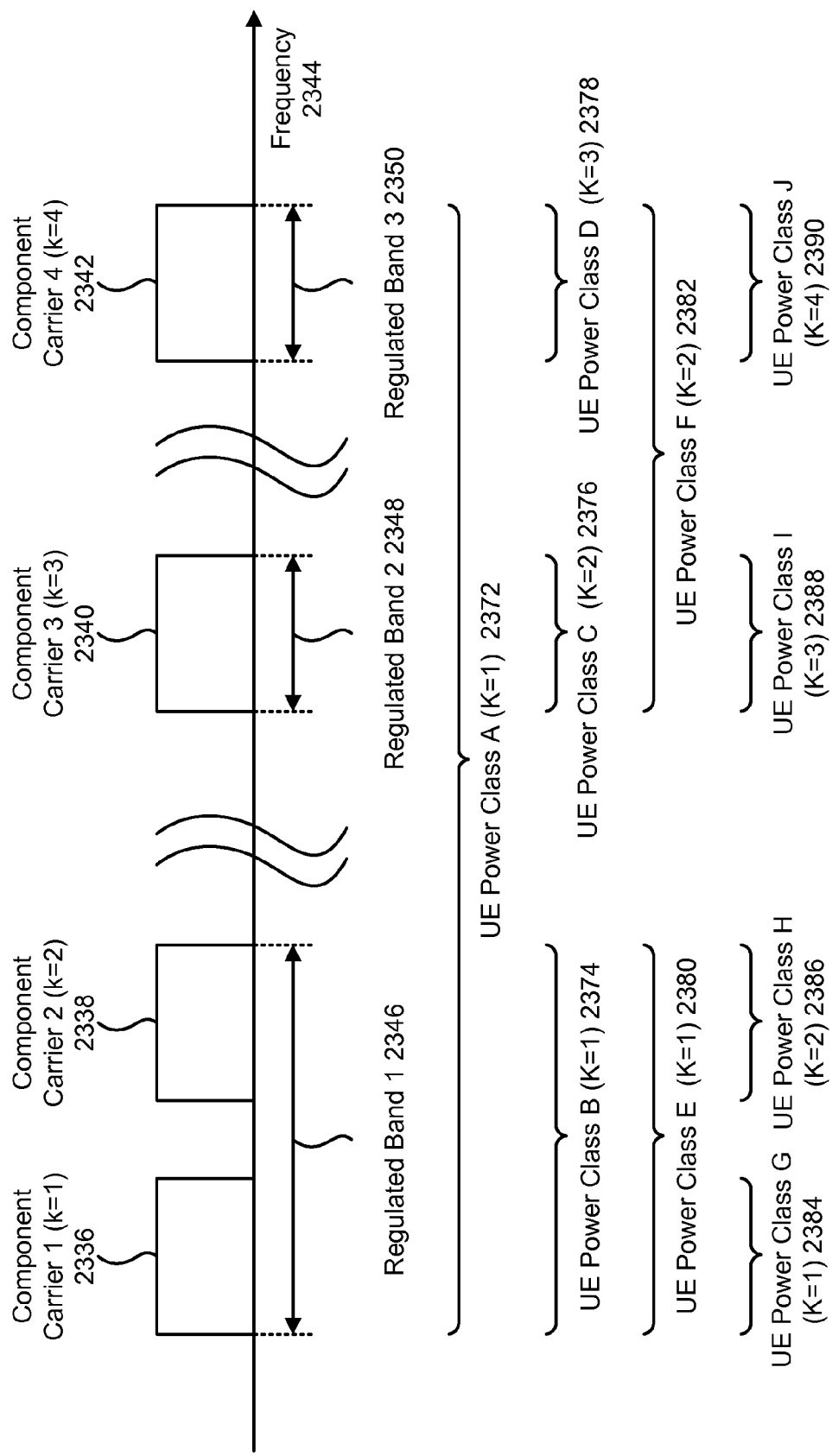
FIG. 23E is a diagram illustrating yet another example of a plurality of regulated frequency bands and component carriers.

FIG. 23E is a diagram illustrating yet another example of a plurality of regulated frequency bands and component carriers. FIG. 23E also illustrates several configurations of how UE power classes may be applied to regulated bands and/or component carriers. The component carriers 2336, 2338, 2340, 2342 and regulated bands 2346, 2348, 2350 in FIG. 23E are shown on a frequency scale 2344. Each UE power class may specify a maximum transmission power. Each uplink power control procedure (e.g., as illustrated in FIG. 17) may be defined by the UE power class.

In one configuration, UE power class A (K=1) 2372 may be a single designated UE power class applied to all of the regulated bands 2346, 2348, 2350 and hence, all of the component carriers (k=1-4) 2336, 2338, 2340, 2342. In other configurations, multiple UE power classes may be designated and/or applied to individual or multiple component carriers and/or regulated bands. In one example, UE power class B (K=1) 2374 is applied to regulated band 1 2346 (i.e., and hence, to component carrier 1 (k=1) 2336 and component carrier 2 (k=2) 2338). Regulated band 2 2348 may use UE power class C (K=2) 2376 while regulated band 3 2350 uses UE power class D (K=3) 2378.

In another configuration, a single UE power class may be applied to multiple component carriers on separate regulated frequency bands. For example, UE power class F (K=2) 2382 may be applied to component carrier 3 (k=3) 2340 and component carrier 4 (k=4) 2342, which are separated between regulated band 2 2348 and regulated band 3 2350. UE power class E (K=1) 2380, for example, may be applied to regulated band 1 2346 (e.g., and thus component carrier 1 (k=1) 2336 and component carrier 2 (k=2) 2338).

In yet another configuration, a separate UE power class may be applied to each individual component carrier. In this example, component carrier 1 (k=1) 2336 uses UE power class G (K=1) 2384, component carrier 2 (k=2) 2338 uses UE power class H (K=2) 2386, component carrier 3 (k=3) 2340 uses UE power class I (K=3) 2388 and component carrier 4 (k=4) 2342 uses UE power class J (K=4) 2390. Although only several possible configurations are illustrated in FIG. 23E, several other configurations of UE power classes may be used between regulated bands and component carriers. Thus, FIG. 23E illustrates that if each regulated band and/or component carrier uses separate power amplifiers, indicated by separate K values, then a separate UE power class may be applied to each regulated band and/or component carrier.

Several other configurations may also be used in a similar manner as that described herein. For example, one power amplifier (e.g., on a wireless communication device 104) may support more than one (i.e., multiple) UE power classes. Conversely, multiple power amplifiers (e.g., on a wireless communication device 104) may support a single UE power class.

Figures 23F, 23G:
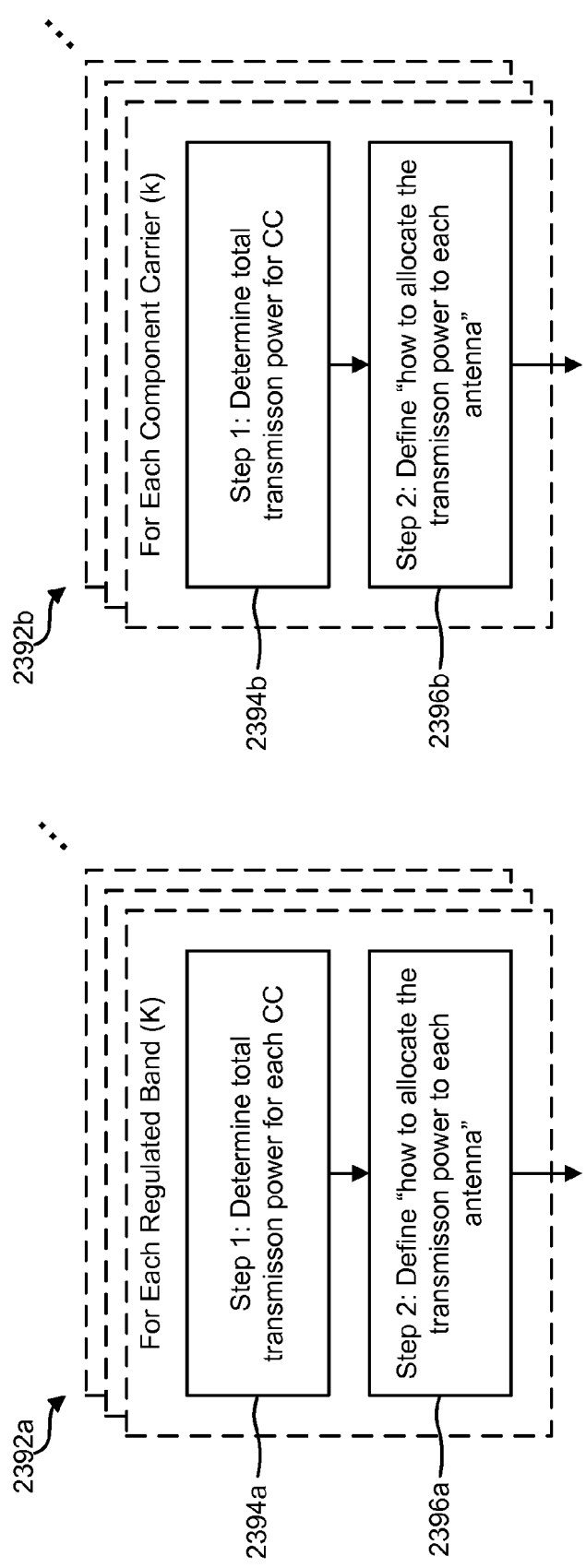
FIG. 23F is a flow diagram illustrating another configuration of a method for performing uplink transmission power control for a plurality of regulated frequency bands.
FIG. 23G is a flow diagram illustrating a configuration of a method for performing uplink transmission power control for a plurality of component carriers.

FIG. 23F is a flow diagram illustrating another configuration of a method 2392a for performing uplink transmission power control for a plurality of regulated frequency bands. For each regulated band used, a wireless communication device 104 may determine 2394a a total transmission power for each component carrier and allocate 2396a transmission power to each antenna accordingly. More specifically, step 1 2394a in FIG. 23F for each of the regulated bands may be the same procedure that is carried out in step 1 1702 of FIG. 17 and step 2 2396a in FIG. 23F may be the same procedure carried out in step 2 1704 of FIG. 17.

Separate K values indicating separate power amplifiers may be used for each regulated band (e.g., on a wireless communication device), indicating that an individual or separate uplink power control procedure 2392a may be followed for each regulated band. Thus, the UE power class may be set separately for each regulated frequency band (e.g., as illustrated in FIG. 23E). Furthermore, it should be noted that the maximum transmission power (e.g., as shown in step 1-2 1804 in FIG. 19) may be set separately for each regulated band. This is because the maximum transmission power may be defined by each UE power class that is applied to each regulated frequency band (e.g., a separate UE power class may correspond to each regulated band). For example, the maximum transmission power may be as discussed above (e.g., 17 dBm or 23 dBm as discussed in connection with FIGS. 20-22).

FIG. 23G is a flow diagram illustrating a configuration of a method 2392b for performing uplink transmission power control for a plurality of component carriers. If separate K values indicating a separate UE power amplifier is used for each component carrier, the uplink power control procedure may be the procedure illustrated in FIG. 23G. A wireless communication device 104 may determine 2394b a total transmission power for the component carrier and allocate 2396b transmission power to each antenna 106 accordingly. More specifically, step 1 2394b in FIG. 23G for each of the component carriers may be the same procedure that is carried out in step 1 1702 of FIG. 17 and step 2 2396b in FIG. 23F may be the same procedure carried out in step 2 1704 of FIG. 17. That is, an individual or separate uplink power control procedure 2392a may be followed for each component carrier. Thus, the UE power class may be set separately for each regulated component carrier (e.g., as illustrated in FIG. 23E). Furthermore, it should be noted that the maximum transmission power (e.g., as shown in step 1-2 1804 in FIG. 19) may be set separately for each component carrier (e.g., each "k"). This is because the maximum transmission power may be defined by each UE power class that is applied to each component carrier. For example, the maximum transmission power may be as discussed above, though applied to component carriers (e.g., where k=K) instead of regulated frequency bands (e.g., 17 dBm or 23 dBm as discussed in connection with FIGS. 20-22).

As illustrated in FIGS. 23F and 23G, each regulated frequency band or component carrier may have a separate individual power control procedure. By extension, each power amplifier used on the wireless communication device 104 may also have a separate power control procedure.

Figure 23H:
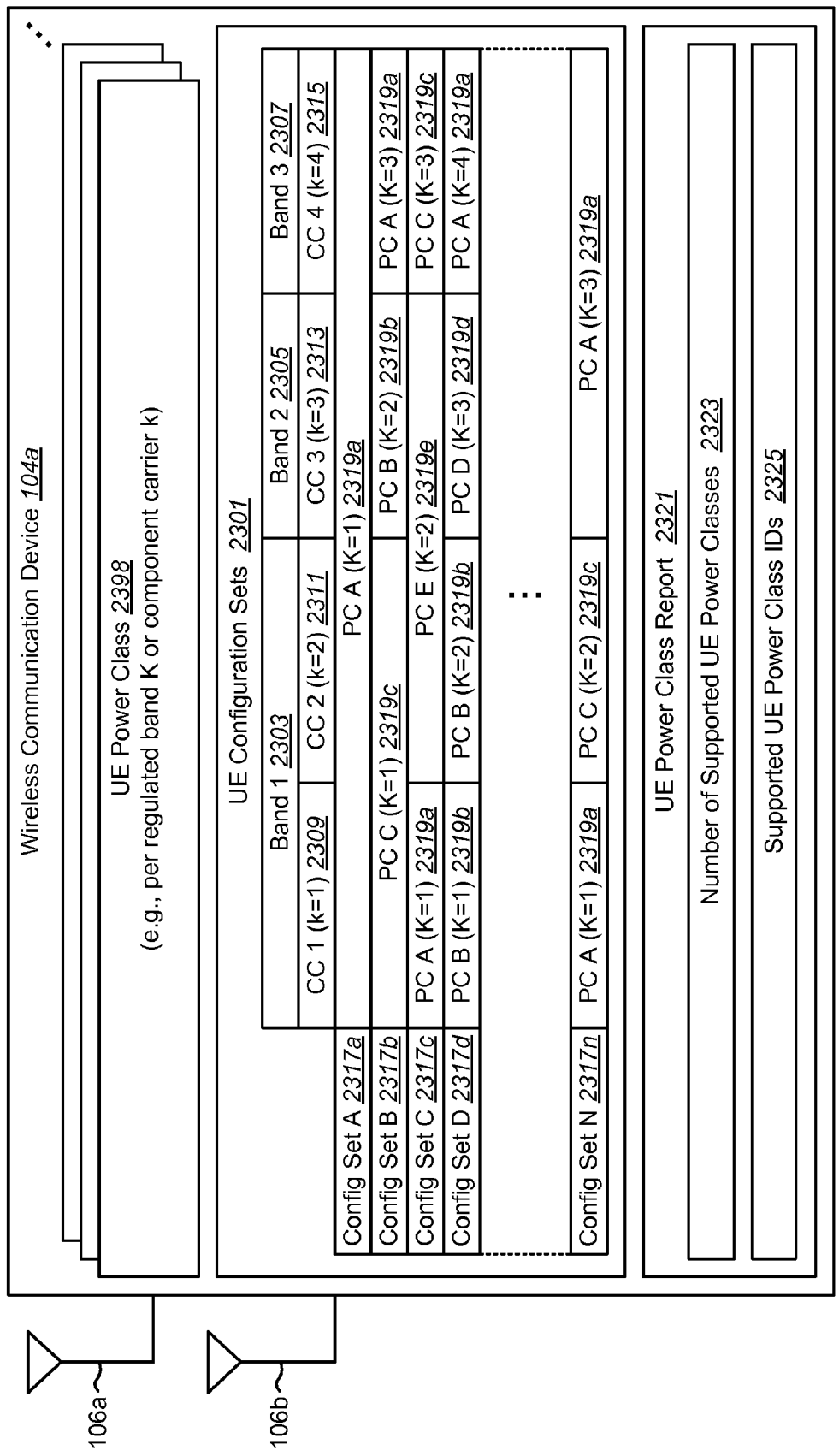
FIG. 23H is a block diagram illustrating one configuration of a wireless communication device in which systems and methods for performing uplink transmission power control on a wireless communication device for antenna port mode and transmission mode transitions may be implemented.

FIG. 23H is a block diagram illustrating one configuration of a wireless communication device 104a in which systems and methods for performing uplink transmission power control on a wireless communication device for antenna port mode and transmission mode transitions may be implemented. The wireless communication device 104a may utilize multiple antennas 106a-b to transmit and receive information.

The wireless communication device 104a may be implemented to support multiple UE power classes 2398. The UE power classes may be defined by a specification such as the third generation partnership project (3GPP), for example. A UE power class defines a maximum output power for that UE power class. As discussed above, each UE power class 2398 could be applied to individual or multiple regulated bands and/or component carriers (k). This may enable a wireless communication device 104a to support multiple UE configuration sets 2301. Each configuration set 2317 may have its own uplink power control procedure, separated by each component carrier and/or frequency band and/or power amplifier.

FIG. 23H illustrates several examples of UE configuration sets 2301. A UE configuration set 2317 may generally include one or more UE power classes 2398 as applied to one or more regulated bands 2303, 2305, 2307 and/or one or more component carriers 2309, 2311, 2313, 2315. A UE configuration set 2317 may be used to denote different UE classes (i.e., not to be confused with UE power classes), UE categories, or UE capabilities combined with other UE characteristics. Each of these classes, categories or capabilities may define varying wireless communication device capabilities (e.g., in terms of data rates or varying maximum transmission powers). In one example, a UE capability (e.g., capability information) is a diverse set of information. It may include, for example, release information of a UE, UE category information, UE class information and/or a band list which is supported by the UE, etc. A UE category or UE class may include the number of UE transmission antennas supported by the UE and/or the data rate supported by the UE, etc. In one example, UE categories and UE capabilities may be organized hierarchically, such that a capability may include categories, etc.

For convenience, in FIG. 23H "UE Configuration Set" has been abbreviated as "Config Set," "component carrier" has been abbreviated as "CC," "UE power class" has been abbreviated as "PC" and "regulated frequency band" or "frequency chunk" has been abbreviated as "Band" in the table of UE configuration sets 2301.

In one example configuration, UE configuration set A 2317a (i.e., "Config Set A") applies the UE power class A (K=1) 2319a to all of the regulated bands (e.g., Band 1 2303, Band 2 2305, Band 3 2307) and component carriers (e.g., CC 1 2309, CC 2 2311, CC 3 2313, CC 4 2315) utilized by the wireless communication device 104a. Another example UE configuration set B 2317b applies separate UE power classes to each band (i.e., power class C (K=1) 2319c to band 1 2303, power class B (K=2) 2319b to band 2 2305 and power class A (K=3) 2319a to band 3 2307).

In another example configuration, a UE power class is applied to multiple component carriers in separate bands. That is, UE configuration set C 2317c applies power class A (K=1) 2319*a* to component carrier 1 2309 and power class C (K=3) 2319*c* to component carrier 4 2315, while power class E (K=2) 2319E is applied to both component carrier 2 2311 which resides in band 1 2303 and component carrier 3 2313 which resides in band 2 2305.

Another UE configuration set may apply separate UE power classes to each component carrier. That is, UE configuration set D 2317*d* applies UE power class B (K=1) 2319*b* to component carrier 1 2309, UE power class B (K=2) 2319*b* also to component carrier 2 2311, UE power class D (K=3) 2319*d* to component carrier 3 2313 and UE power class A (K=4) 2319*a* to component carrier 4 2315.

UE Configuration set N 2317*n*, for example, applies UE power class A (K=1) 2319*a* to component carrier 1 2309 and UE power class C (K=2) 2319*c* to component carrier 2 2311. UE Configuration set N 2317*n* further applies power class A (K=3) 2319*a* to both band 2 2305 and band 3 2307. Although only a few example UE configuration sets 2317 are illustrated in FIG. 23H, many other configuration sets 2317 could be used.

The wireless communication device 104*a* may include a UE power class report 2321. This UE power class report 2321 may include a number of supported UE power classes 2323 and supported UE power class IDs 2325. For example, assuming that the wireless communication device supports UE power classes A-E, the number of supported UE power classes 2323 would be 5. The supported UE power class IDs 2325 identifies each of the specific UE power classes 2398 supported on the wireless communication device 104*a* (e.g., A, B, C, D and E). The UE power class report 2321 may be sent to a base station 102 (e.g., eNB), for example.

Figure 23I:
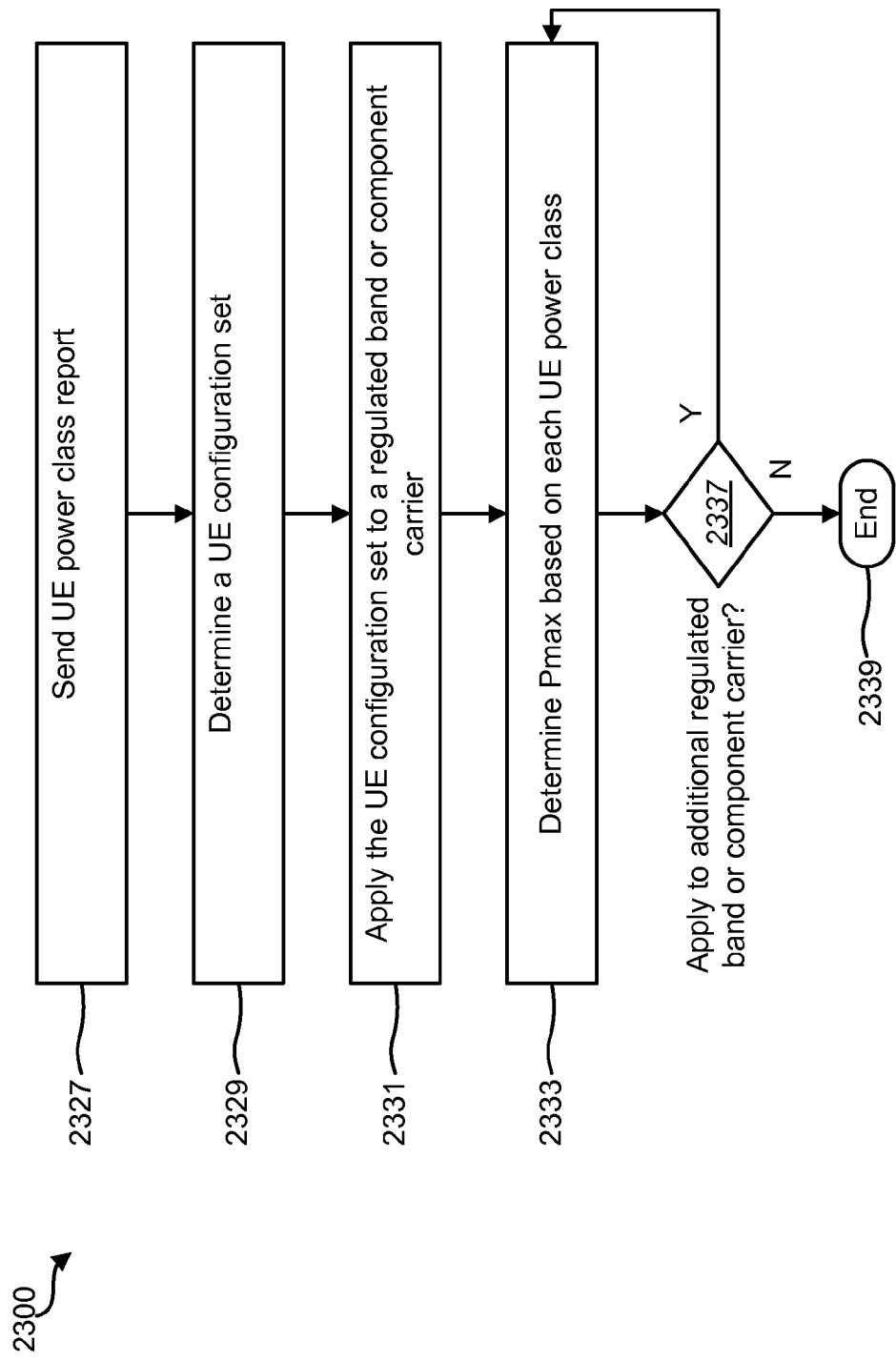
FIG. 23I is a flow diagram illustrating a configuration of a method for performing uplink transmission power control on a wireless communication device for antenna port mode and transmission mode transitions.

FIG. 23I is a flow diagram illustrating one configuration of a method 2300 for performing uplink transmission power control on a wireless communication device 104 for antenna port mode and transmission mode transitions. This method 2300 allows flexibility for operators and UE manufacturers, where different UE categories or classes can be bundled into one physical UE by frequency band, component carrier or power amplifier. Operators and UE manufacturers may thus flexibly create combinations of different UE classes. Multimode wireless communication devices may thus be manufactured and deployed, satisfying a varying mix of UE capabilities and operator services.

A wireless communication device 104 may send 2327 a UE power class report 2321 (e.g., to a base station 102). The wireless communication device 104 may determine 2329 a UE configuration set. For example, a wireless communication device 104 could generate a UE configuration set 2301 based on performance or commands from a base station 102. Alternatively, the wireless communication device 104 could select a UE configuration set 2317 from a table of UE configuration sets 2301.

The wireless communication device 104 may then apply 2331 the UE configuration set 2317 to a regulated band or component carrier. The UE configuration step (e.g., applying 2331 the UE configuration) may occur less frequently because appropriate UE configurations for a UE which is connected to a specific operator's network may depend on the UE's physical configuration. The wireless communication device 104 may determine 2333 $P_{MAX}$ based on each UE power class (e.g., as illustrated in equations (1), (2), or (3) above). Determining 2333 $P_{MAX}$ may be similar to determining 1702 the total transmission power in FIG. 17.

The wireless communication device 104 may determine 2337 whether to apply the UE configuration set 2317 to an additional regulated band or component carrier. If the wireless communication device 104 determines 2337 not to apply the UE configuration set 2317 to an additional regulated band or component carrier (e.g., there are no more regulated bands or component carrier to which the UE configuration set has not already been applied), then the method 2300 may end 2339. However, if the wireless communication device 104 determines 2337 to apply the UE configuration set 2317 to an additional regulated band or component carrier, the method 2300 may return to determine 2333 $P_{MAX}$ based on each power class.

For example, assuming there are two component carriers to which a UE configuration set (e.g., two UE power classes) should be applied, after determining 2333 $P_{MAX}$ based on each UE power class, the wireless communication device 104 would determine 2337 that an additional UE power class in the UE configuration set needs to be applied. Thus, the wireless communication device 104 determines 2333 $P_{MAX}$ for the second UE power class (e.g., for the second component carrier), and the method proceeds as before.

In one configuration, the wireless communication device 104 may send 2327 the UE power class report 2321 and determine 2329 a UE configuration set 2317 only once, at the time of initial access or a base station 102 request. By doing this, the UE configuration (e.g., which regulated band or component carrier will use which PA) will be determined and uplink power control parameters (e.g., $P_{MAX}$ in equations (1), (2), and/or (3)) will be determined. These parameters may be determined less frequently (e.g., during initial access or when a base station 102 requires an update). The wireless communication device 104 may determine 2333 $P_{MAX}$ based on each UE power class. The wireless communication device 104 may determine 2337 whether the configuration set 2317 needs to be applied to another regulated band or component carrier (e.g., the next K) only once or several times (i.e., once for every uplink transmission). These steps may be carried out at the time of initial access or a base station 102 request. Once uplink parameters (e.g. K and/or $P_{MAX}$) will be determined in these steps, uplink power control procedure (e.g. 2330*a-b* in FIG. 23C, 2392*a* in FIG. 23F or 2392*b* in FIG. 23G) will be carried out at the time of each uplink transmission.

It should be noted that several of the steps illustrated in FIG. 23I may also be performed on a base station 102. For example, a base station 102 could determine 2329 a UE configuration set and send a command to the wireless communication device 104 to use the determined UE configuration. Furthermore, a base station 102 could determine 2333 $P_{MAX}$ based on each UE power class. On the other hand, the UE (i.e., wireless communication device 104) may choose a configuration set 2317 from the table of configuration sets 2301 and report the selected configuration set 2317 to a base station 102.

In SU-MIMO (rank 1) mode 116*c*, a wireless communication device 104 may use only one antenna 106 physically. It may be said that an antenna turn-off vector is used. When an antenna turn-off vector is used, a wireless communication device 104 is assumed to be in the single antenna port mode 114*a*. In other words, the same transmission power as shown in FIG. 21 for one antenna 106*a* will be allocated. For the remaining antenna 106*b*, no power will be allocated.

At least some aspects of the present disclosure relate to a transmission diversity implementation allowing both single and multiple antenna transmission schemes. The PUSCH transmission diversity scheme may include two steps: the first step is an open-loop transmission diversity scheme, and the second step is an antenna port weighting process. The open-loop transmission diversity scheme may be SFBC (space-frequency block coding), STBC (space-time block coding), FSTD (frequency selective transmission diversity) or CDD (cyclic delay diversity).

Figure 24:
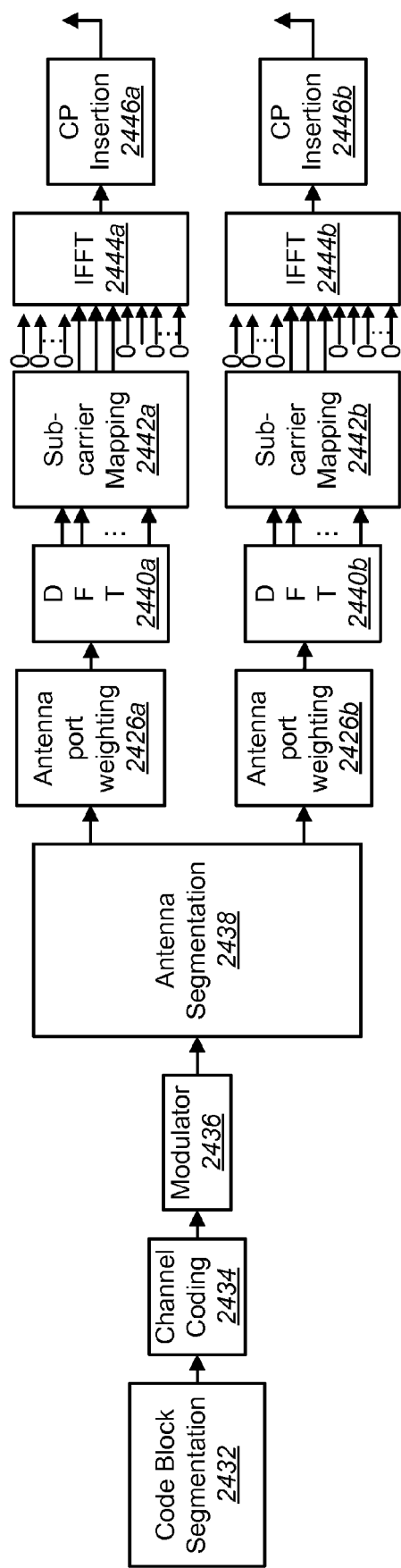
FIG. 24 illustrates an open-loop transmission diversity scheme implemented as frequency selective transmission diversity (FSTD)

After the open-loop transmission diversity process, there may be an antenna port weighting process. Assuming that SC-FDMA (single carrier-frequency diversity multiple access) is used, there may be a discrete Fourier transform (DFT), an inverse fast Fourier transform (IFFT) and a CP insertion process after the open-loop transmission diversity process and the antenna port weighting process. This is the case for FSTD, as shown in FIG. 24, and for CDD, as shown in FIG. 26. Alternatively, there may be an IFFT and CP insertion process after the open-loop transmission diversity process and the antenna port weighting process. This is the case for SFBC, as shown in FIG. 25.

FIG. 24 illustrates the open-loop transmission diversity scheme implemented as FSTD. The FSTD open-loop transmission diversity scheme includes a code block segmentation module 2432, a channel coding module 2434, a modulator module 2436, and an antenna segmentation module 2438. The antenna segmentation module 2438 has two outputs. The first output of the antenna segmentation module 2438 is processed by a first antenna port weighting module 2426a, a first discrete Fourier transform (DFT) module 2440a, a first sub-carrier mapping module 2442a, a first inverse fast Fourier transform (IFFT) module 2444a and a first cyclic prefix (CP) insertion module 2446a. The second output of the antenna segmentation module 2438 is processed by a second antenna port weighting module 2426b, a second DFT module 2440b, a second subcarrier mapping module 2442b, a second IFFT module 2444b and a second CP insertion module 2446b.

Figure 25:
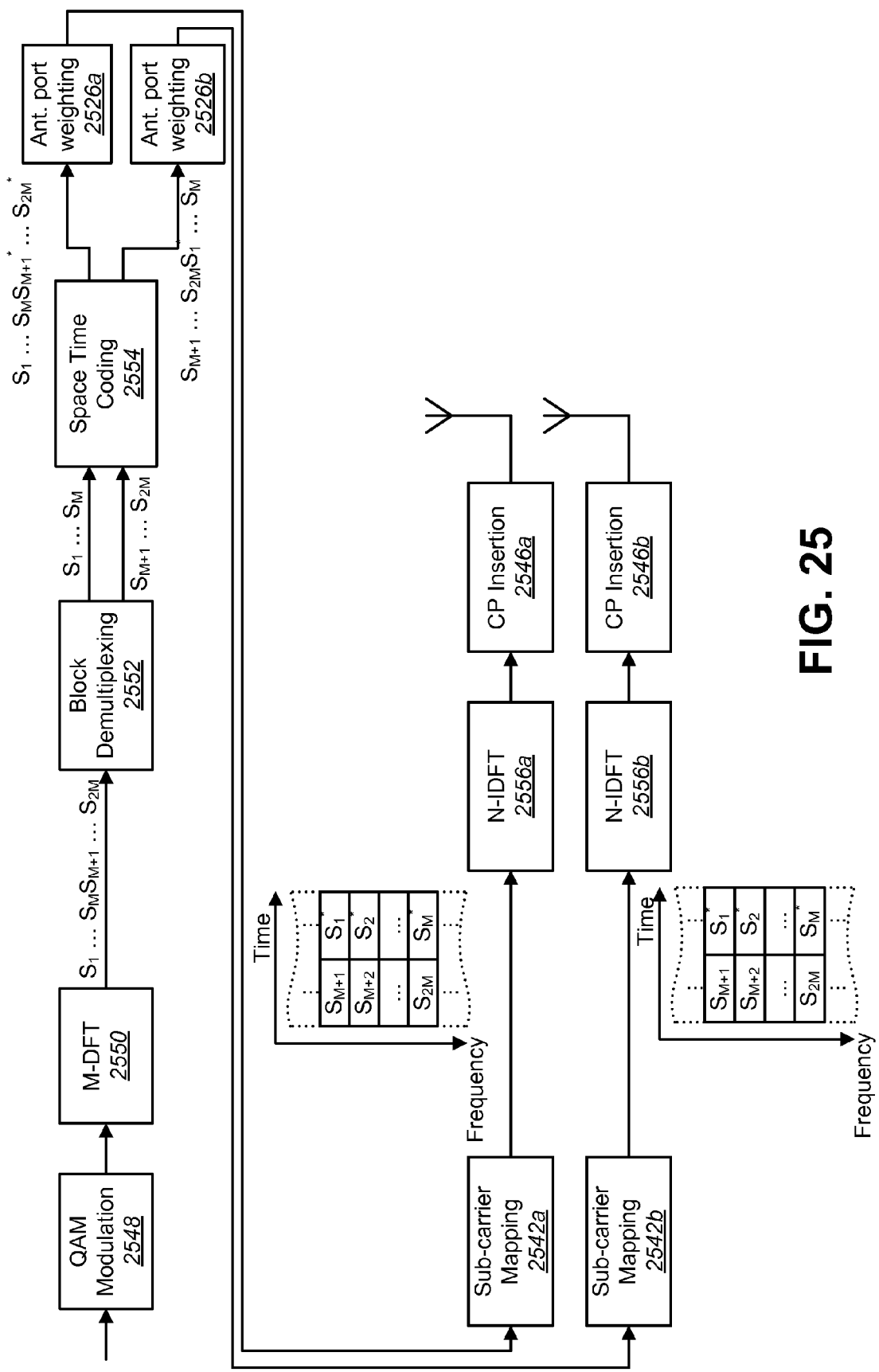
FIG. 25 illustrates an open-loop transmission diversity scheme implemented as space-frequency block coding (SFBC)
Figure 26:
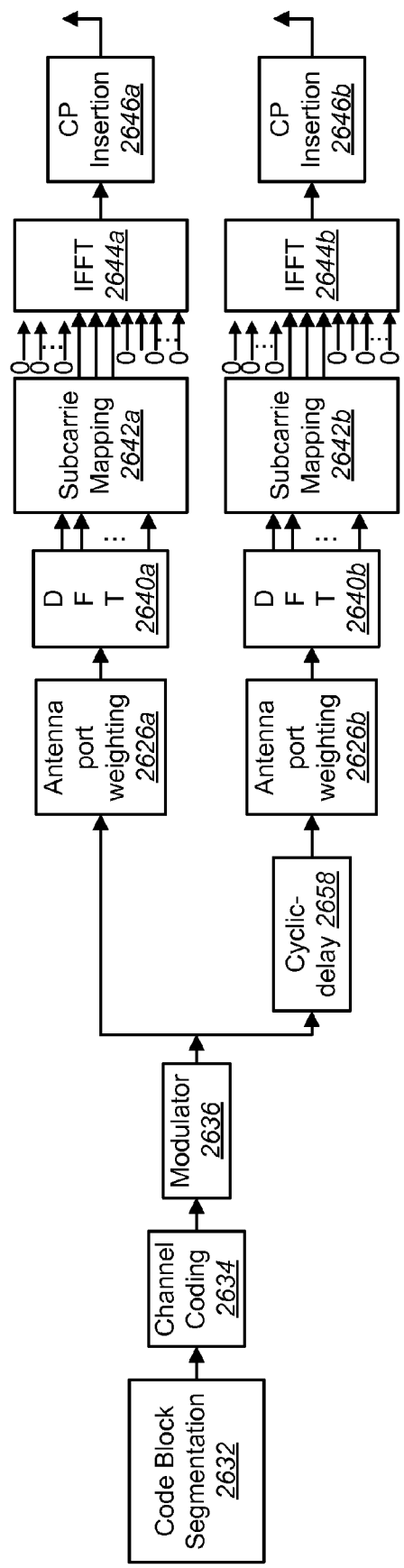
FIG. 26 illustrates an open-loop transmission diversity scheme implemented as cyclic delay diversity (CDD)

FIG. 25 illustrates the open-loop transmission diversity scheme implemented as SFBC. The SFBC open-loop transmission diversity scheme includes a quadrature amplitude modulation (QAM) module 2548, an M-DFT module 2550, a block demultiplexing module 2552, and a space-time coding module 2554. The space-time coding module 2554 has two outputs. The first output of the space-time coding module 2554 is processed by a first antenna port weighting module 2526a, a first sub-carrier mapping module 2542a, a first N-IDFT (inverse discrete Fourier transform) module 2556a, and a first CP insertion module 2546a. The second output of the space-time coding module 2554 is processed by a second antenna port weighting module 2526b, a second sub-carrier mapping module 2542b, a second N-IDFT module 2556b, and a second CP insertion module 2546b.

FIG. 26 illustrates the open-loop transmission diversity scheme implemented as CDD. The CDD open-loop transmission diversity scheme includes a code block segmentation module 2632, a channel coding module 2634 and a modulator module 2636. The modulator module 2636 has two outputs. The first output of the modulator module 2636 is processed by a first antenna port weighting module 2626a, a first DFT module 2640a, a first subcarrier mapping module 2642a, a first IFFT module 2644a and a first CP insertion module 2646a. The second output of the modulator module 2636 is processed by a cyclic delay module 2658, a second antenna port weighting module 2626b, a second DFT module 2640b, a second subcarrier mapping module 2642b, a second IFFT module 2644b, and a second CP insertion module 2646b.

As shown in FIG. 27A, an antenna port weighting process 2726a may multiply the input signal by x. Alternatively, as shown in FIG. 27B, an antenna port weighting process 2726b may multiply the input signal by $\sqrt{1-x^2}$. In either case, x may be any of the following: x={1,sqrt(½), 0}; x={1, sqrt(⅓),sqrt(½), sqrt(⅔),0}; or x={1, sqrt(⅙), sqrt(⅓), sqrt(½), sqrt(⅔), sqrt(⅚), 0}. Either of the antenna port weighting processes 2726a, 2726b in FIGS. 27A and 27B may be utilized as the antenna port weighting modules 2426a, 2426b, 2526a, 2526b, 2626a, 2626b in FIGS. 24-26. Antenna port weighting may be applied to both data and the demodulation reference signal (DMRS). In the case of two uplink transmit antennas 106a, 106b, when x=0 or 1, this implies that it is effectively a single antenna 106 transmission.

A wireless communication device 104 may be configured so that it always uses two antennas 106a, 106b when it is in transmit diversity mode 116b. For example, in case two 320 (FIG. 3), transmit diversity mode 116b belongs to multiple antenna port mode 114b only. However, a large antenna gain imbalance may degrade transmission diversity performance. Moreover, transmit diversity mode 116b may make battery life shorter. Hence, it may be beneficial for a wireless communication device 104 to transition from the multiple antenna port mode 114b to the single antenna port mode 114a when it is in the transmit diversity mode 116b.

At least some aspects of the systems and methods disclosed herein relate to switching between single antenna port mode 114a and multiple antenna port mode 114b when using transmit diversity mode 116b. There are at least three different mechanisms by which this can occur. First, the wireless communication device 104 can autonomously select the value of x (i.e., without any explicit or implicit signaling from the base station 102 to the wireless communication device 104). Second, the base station 102 may configure x via PDCCH (physical downlink control channel) signaling. Third, the wireless communication device 104 may overwrite the x value that was configured by the base station 102. Allowing the flexibility to transition between single antenna port mode 114a and multiple antenna port mode 114b in transmit diversity mode 116b may improve performance under a large antenna gain imbalance and may also save power and hence, may improve the battery performance.

The first mechanism mentioned above is that the wireless communication device 104 may autonomously select the value of x during transmit diversity mode 116b. In other words, without any explicit or implicit signaling from the base station 102 to the wireless communication device 104, the wireless communication device 104 may change the value of x. By applying an antenna port weighting process 2726 on both data and DMRS, the base station 102 reception process can be made transparent of the x value used at the wireless communication device 104. Hence, the wireless communication device 104 can autonomously select the value of x. Moreover, if there is large antenna gain imbalance between antennas 106a, 106b, this proposed scheme may have performance gain since one can use all transmission power on one antenna 106a if the other antenna's 106b gain is too small. Alternatively, when the wireless communication device's 104 battery level is low, one can make battery life longer by using only one antenna 106a, i.e., setting the value of x to 1. However, both antenna 106 gain imbalance and wireless communication device 104 battery level may be known only at the wireless communication device 104. So it may be beneficial for the wireless communication device 104 to allow autonomous x value selection.

Based on pathloss information or the wireless communication device's 104 battery level (which may be measured on the wireless communication device 104 side through downlink reference signal reception), the wireless communication device 104 may select x autonomously. For example, when the wireless communication device 104 measures the downlink reference signal and notices the large antenna gain imbalance (or large pathloss difference), the wireless communication device 104 may set the value of x to 1 without any signaling to the base station 102. As another example, when the wireless communication device 104 measures the battery level and notices the battery level is low, the wireless communication device 104 may set the value of x to 1 without any signaling to the base station 102.

On the other hand, if the base station 102 can estimate the uplink channel and antenna gain imbalance (e.g., via channel estimation employing channel reciprocity or feedback from the wireless communication device 104) or the battery status at the wireless communication device 104, the base station 102 can configure the value of x to be used at the wireless communication device 104 and hence the network can avoid unexpected behavior by the wireless communication device 104.

The PDCCH may include the antenna port weighting bit explicitly. For example, if x={1,sqrt(½), 0}, at least two bits may be needed to indicate the x value to the wireless communication device 104. The PDCCH may carry two bits to indicate the x value to the wireless communication device 104. Another solution may be for the PDCCH to include the antenna port weighting bit implicitly. For example, an identifier for the wireless communication device 104 can be masked with implicit signaling that stands for x indexes as shown in FIG. 28.

The base station 102 may select the value of x based on pathloss information that is reported from the wireless communication device 104 (e.g., reference signal received power). Alternatively, the base station 102 may select the value of x based on pathloss information that is measured on the base station 102 side through SRS reception. In either case, the base station 102 may configure x via PDCCH.

Figure 29:
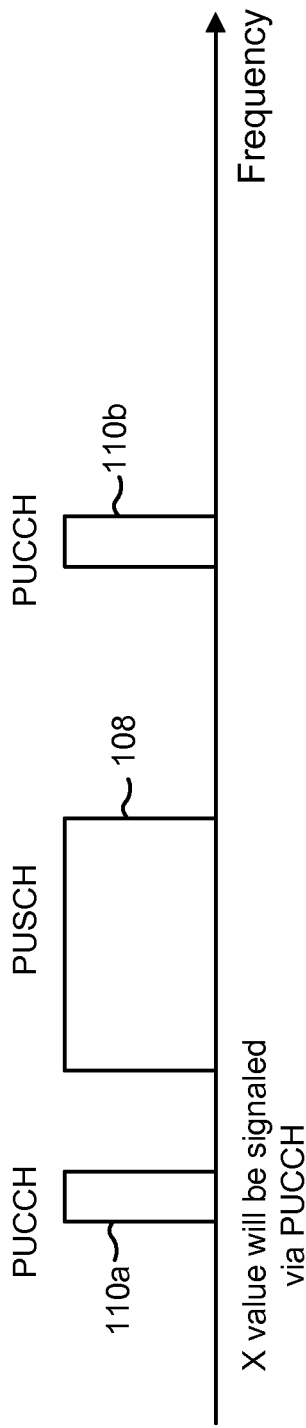
FIG. 29 illustrates an example showing how a wireless communication device may notify a base station that it has overwritten an antenna port weighting process parameter (x)
Figure 30:
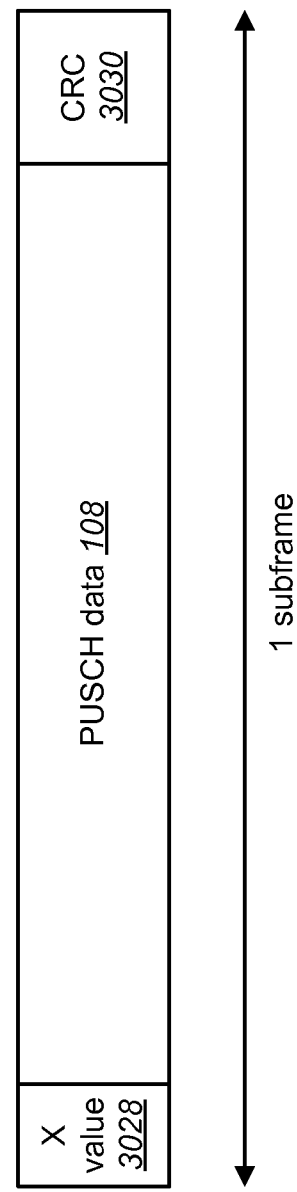
FIG. 30 illustrates another example showing how a wireless communication device may notify a base station that it has overwritten an antenna port weighting process parameter (x)
Figure 31:
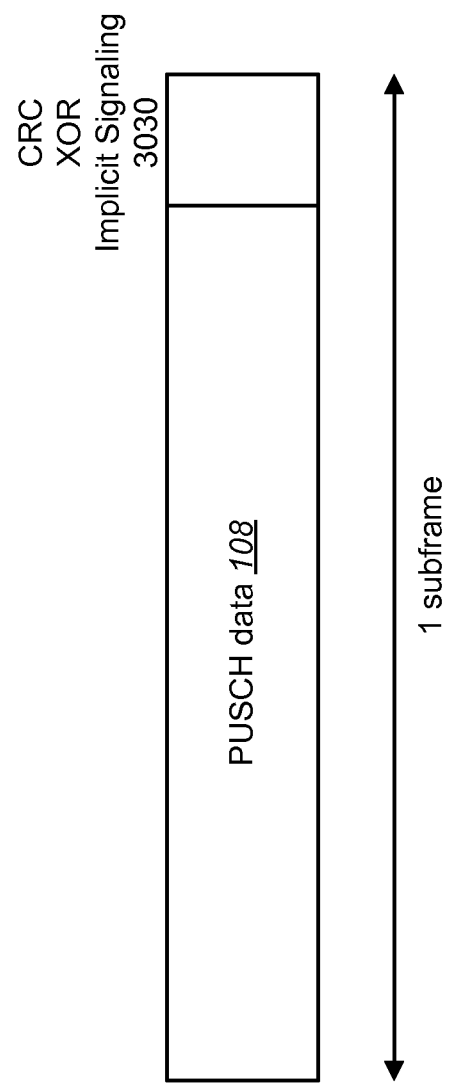
FIG. 31 illustrates another example showing how a wireless communication device may notify a base station that it has overwritten an antenna port weighting process parameter (x)

The wireless communication device 104 may overwrite the value of x that was configured by the base station 102. In the event that the wireless communication device 104 overwrites the configured x value sent by the base station 102 over the PDCCH, there may be a need for the wireless communication device 104 to signal to the base station 102 the choice of the x value. This may be accomplished with PUSCH 108 transmission. For example, as shown in FIG. 29, the wireless communication device 104 may send PUSCH 108 and PUCCH 110a, 110b at the same subframe, and the PUCCH 110a may carry the x value that is used in PUSCH 108 transmission. As another example, the PUSCH 108 may carry the x value 3028 as control information as shown in FIG. 30. The symbol and subcarriers that carry the x value 3028 may use a pre-defined x value 3028 (for example, "x=1"), and the remaining parts may be decoded assuming the "received x value" is used for them. As another example, as shown in FIG. 31, the CRC 3030 in the PUSCH 108 may be masked by the "x value" 3028. In this case, the base station 102 may decode the received PUSCH 108 multiple times by trying multiple x values 3028 as a parameter.

If the base station 102 detects that the wireless communication device 104 transitioned to single antenna port mode 114a autonomously by an estimated "x value" via PUSCH 108 reception, the base station 102 may consider that the wireless communication device 104 has autonomously transitioned from multiple antenna port mode 114b to single antenna port mode 114a.

Figure 32:
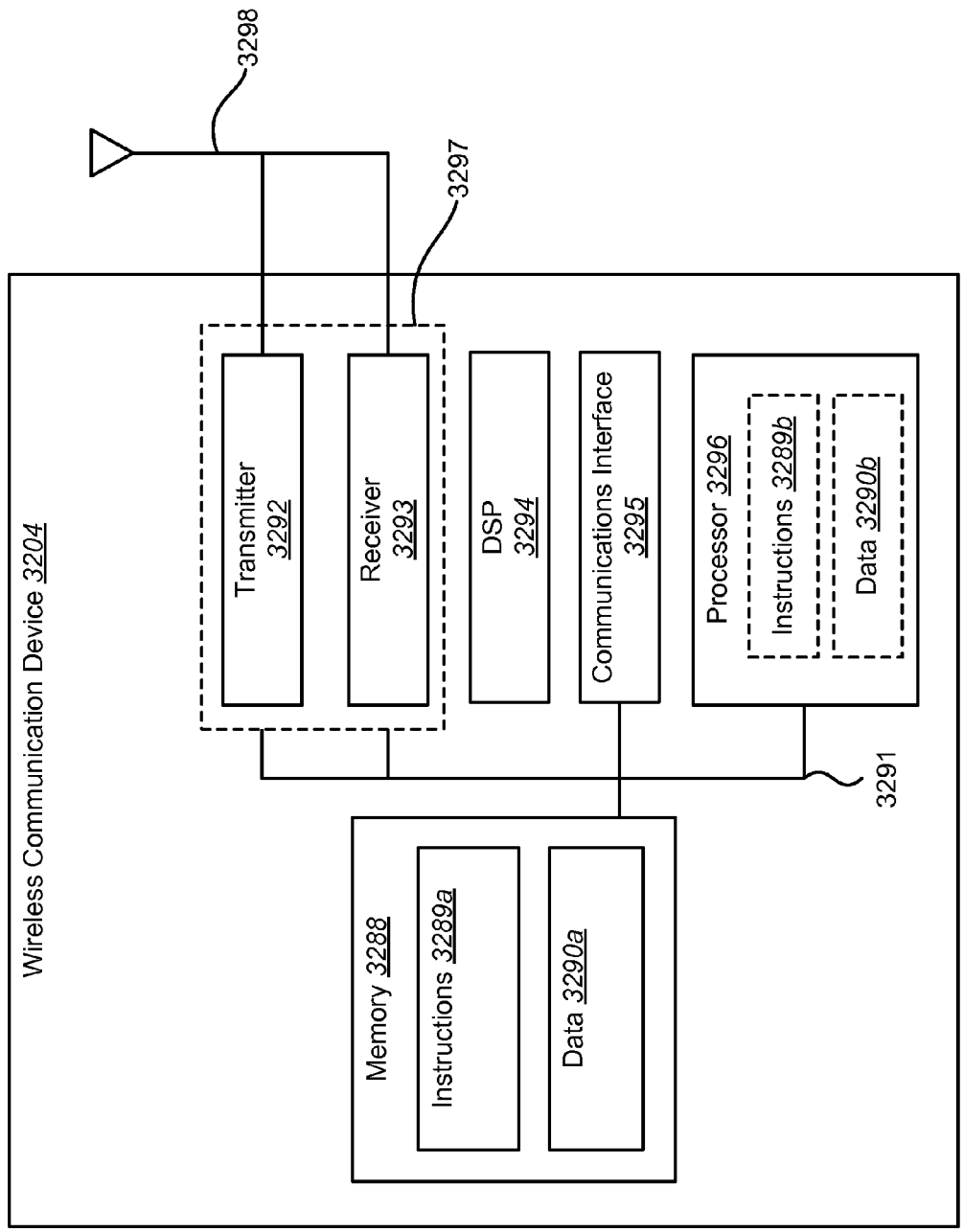
FIG. 32 illustrates various components that may be utilized in a wireless communication device.

FIG. 32 illustrates various components that may be utilized in a wireless communication device 3204. The wireless communication device 3204 may be utilized as the wireless communication device 104 in FIG. 1. The wireless communication device 3204 includes a processor 3296 that controls operation of the wireless communication device 3204. The processor 3296 may also be referred to as a CPU. Memory 3288, which may include both read-only memory (ROM), random access memory (RAM) or any type of device that may store information, provides instructions 3289a and data 3290a to the processor 3296. A portion of the memory 3288 may also include non-volatile random access memory (NVRAM). Instructions 3289b and data 3290b may also reside in the processor 3296. Instructions 3289b loaded into the processor 3296 may also include instructions 3289a from memory 3288 that were loaded for execution by the processor 3296. The instructions 3289b may be executed by the processor 3296 to implement the methods disclosed herein.

The wireless communication device 3204 may also include a housing that contains a transmitter 3292 and a receiver 3293 to allow transmission and reception of data. The transmitter 3292 and receiver 3293 may be combined into a transceiver 3297. An antenna 3298 is attached to the housing and electrically coupled to the transceiver 3297. Additional antennas may also be used.

Figure 33:
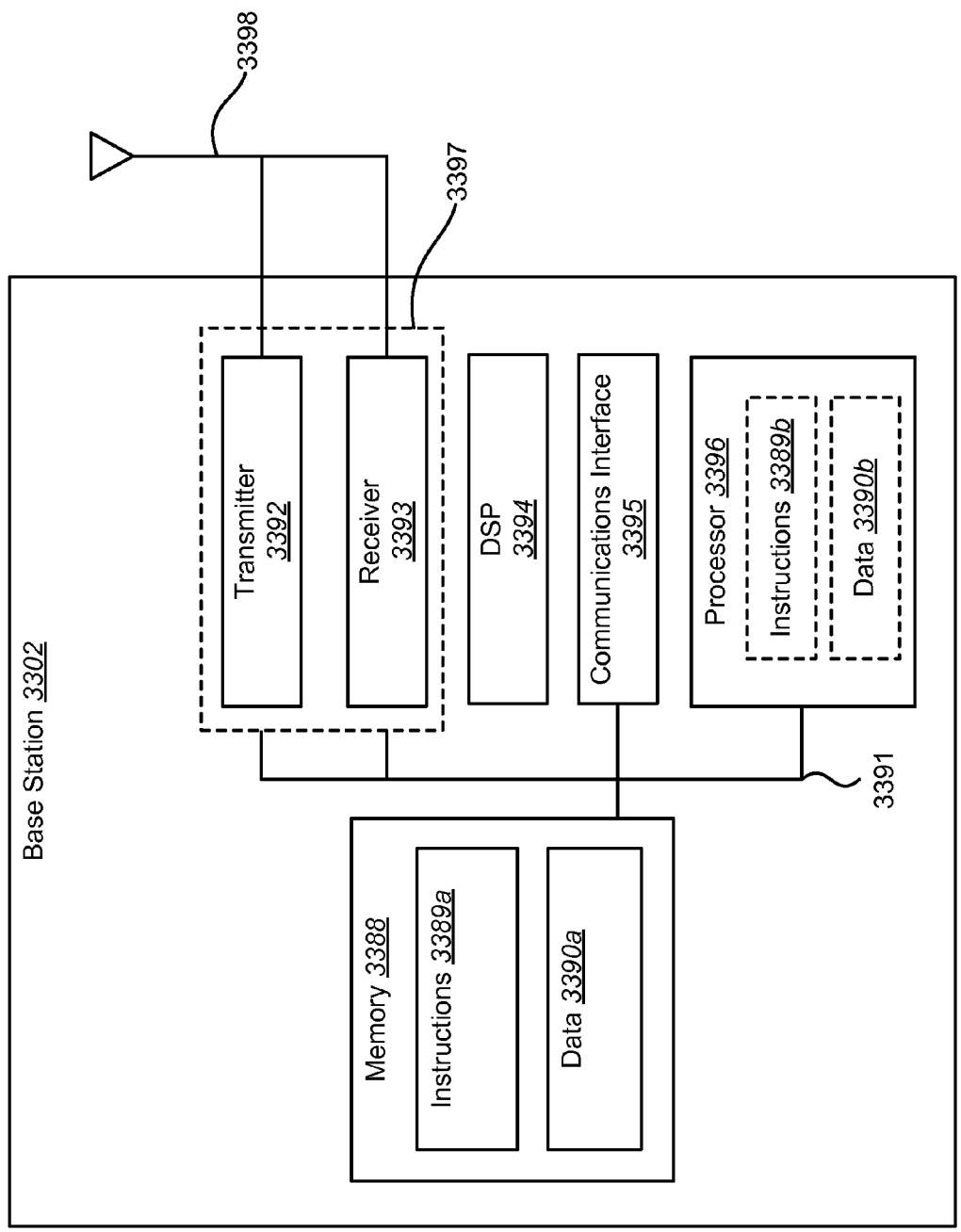
FIG. 33 illustrates various components that may be utilized in a base station.

The various components of the wireless communication device 3204 are coupled together by a bus system 3291 which may include a power bus, a control signal bus, and a status signal bus, in addition to a data bus. However, for the sake of clarity, the various buses are illustrated in FIG. 32 as the bus system 3291. The wireless communication device 3204 may also include a digital signal processor (DSP) 3294 for use in processing signals. The wireless communication device 3204 may also include a communications interface 3295 that provides user access to the functions of the communication device 3302 (e.g., the base station 3302 as illustrated in FIG. 33). The wireless communication device 3204 illustrated in FIG. 32 is a functional block diagram rather than a listing of specific components.

FIG. 33 illustrates various components that may be utilized in a base station 3302. The base station 3302 may be utilized as the base station 102 in FIG. 1. The base station 3302 may include components that are similar to the components discussed above in relation to the wireless communication device 3304, including a processor 3396, memory 3388 that provides instructions 3389a and data 3390a to the processor 3396, instructions 3389b and data 3390b that may reside in the processor 3396, a housing that contains a transmitter 3392 and a receiver 3393 (which may be combined into a transceiver 3397), an antenna 3398 electrically coupled to the transceiver 3397, a bus system 3391, a DSP 3394 for use in processing signals, a communications interface 3395, and so forth.

The term "computer-readable medium" refers to any available medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or a processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A wireless communication device configured for performing uplink transmission power control on a wireless communication device, comprising:
    supporting one or more transmission antenna ports,
    supporting a plurality of uplink component carriers which are configured by a base station, and
    determining a transmission power for a physical uplink shared channel (PUSCH) for each component carrier,
    wherein the transmission power for the PUSCH for each component carrier is scaled from a projected transmission power for the PUSCH in a case that a sum of projected values exceeds a maximum transmission power of the wireless communication device,
    wherein the sum of projected values is a sum of projected PUSCH transmission powers for component carriers and projected physical uplink control channel (PUCCH) transmission power, and
    wherein the maximum transmission power of the wireless communication device is predefined based on a user equipment (UE) power class of the wireless communication device, wherein the UE power class is applied to all of the component carriers.

2. The wireless communication device of claim 1, further comprising:
    scaling the determined transmission power for the PUSCH for each component carrier, and
    allocating the scaled total transmission power to be split equally across the transmission antenna ports where one or more PUSCHs are transmitted.

3. The wireless communication device of claim 1:
    wherein the transmission power for the PUSCH for each component carrier is scaled to zero and the transmission power for the PUCCH is not scaled in the case that the sum of projected values exceeds the maximum transmission power of the wireless communication device.

4. A method for performing uplink transmission power control on a wireless communication device, comprising:
    supporting one or more transmission antenna ports,
    supporting a plurality of uplink component carriers which are configured by a base station, and
    determining a transmission power for a physical uplink shared channel (PUSCH) for each component carrier,
    wherein the transmission power for the PUSCH for each component carrier is scaled from a projected transmission power for the PUSCH in a case that a sum of projected values exceeds a maximum transmission power of the wireless communication device,
    wherein the sum of projected values is a sum of projected PUSCH transmission powers for component carriers and projected physical uplink control channel (PUCCH) transmission power, and
    wherein the maximum transmission power of the wireless communication device is predefined based on a user equipment (UE) power class of the wireless communication device, wherein the UE power class is applied to all of the component carriers.

5. The method of claim 4, further comprising:
    scaling the determined transmission power for the PUSCH for each component carrier, and
    allocating the scaled total transmission power to be split equally across the transmission antenna ports where one or more PUSCHs are transmitted.

6. The method of claim 4:
    wherein the transmission power for the PUSCH for each component carrier is scaled to zero and the transmission power for the PUCCH is not scaled in the case that the sum of projected values exceeds the maximum transmission power of the wireless communication device.

* * * * *